US011991139B2

(12) United States Patent
Blank

(10) Patent No.: US 11,991,139 B2
(45) Date of Patent: *May 21, 2024

(54) AUTOMATED EMAIL PROTOCOL ANALYZER IN A PRIVACY-SAFE ENVIRONMENT

(71) Applicant: ValiMail Inc., San Francisco, CA (US)

(72) Inventor: Seth Joshua Blank, New York, NY (US)

(73) Assignee: ValiMail Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,884

(22) Filed: Sep. 13, 2023

(65) Prior Publication Data
US 2024/0098057 A1    Mar. 21, 2024

Related U.S. Application Data

(60) Provisional application No. 63/407,166, filed on Sep. 16, 2022.

(51) Int. Cl.
*H04L 51/42* (2022.01)
*H04L 51/48* (2022.01)

(52) U.S. Cl.
CPC .............. *H04L 51/42* (2022.05); *H04L 51/48* (2022.05)

(58) Field of Classification Search
CPC ................................ H04L 51/42; H04L 51/48
See application file for complete search history.

(56) References Cited

U.S. PATENT DOCUMENTS

| 8,132,250 | B2 | 3/2012 | Judge et al. |
| 9,143,476 | B2 * | 9/2015 | Dreller ................. H04L 51/226 |
| 9,686,073 | B2 | 6/2017 | Goldstein |
| 9,762,618 | B2 | 9/2017 | Goldstein |
| 9,800,402 | B2 | 10/2017 | Goldstein |
| 10,122,765 | B1 | 11/2018 | Goldstein |

(Continued)

FOREIGN PATENT DOCUMENTS

| EP | 1720123 A1 | 11/2006 |
| EP | 2709046 A1 | 3/2014 |

(Continued)

OTHER PUBLICATIONS

PCT International Search Report and Written Opinion, PCT Application No. PCT/US2023/032762, Dec. 21, 2023, 12 pages.

(Continued)

*Primary Examiner* — Austin J Moreau
(74) *Attorney, Agent, or Firm* — Fenwick & West LLP

(57) ABSTRACT

A computing server may receive an authorization from a domain owner to gain access to email data of the domain owner. The email data may be hosted by a mailbox service provider on behalf of the domain owner. The computing server may determine email protocol check results of the email data retrieved from the mailbox service provider. The computing server may determine that a sender has a number of failed emails in the email data that fail the email protocol check. The computing server may identify, from the email data, one or more recipients of the domain owner to whom the failed emails intend to be sent. The computing server may notify the domain owner regarding information about the one or more recipients.

20 Claims, 16 Drawing Sheets

(56) References Cited

U.S. PATENT DOCUMENTS

| | | |
|---|---|---|
| 10,169,342 B1 | 1/2019 | Ben-Yair et al. |
| 10,229,157 B2 | 3/2019 | Collins et al. |
| 10,237,278 B1 | 3/2019 | Saylor et al. |
| 10,257,231 B2 | 4/2019 | Goldstein |
| 10,897,485 B2 | 1/2021 | Goldstein |
| 11,038,897 B1 | 6/2021 | Wilson et al. |
| 11,743,257 B2 | 8/2023 | Goldstein et al. |
| 2004/0177120 A1 | 9/2004 | Kirsch |
| 2006/0277259 A1 | 12/2006 | Murphy et al. |
| 2010/0082758 A1 | 4/2010 | Golan |
| 2014/0047064 A1 | 2/2014 | Maturana et al. |
| 2014/0164281 A1 | 6/2014 | Balkir et al. |
| 2016/0162591 A1 | 6/2016 | Dokania et al. |
| 2016/0171509 A1 | 6/2016 | Fanous et al. |
| 2016/0205106 A1 | 7/2016 | Yacoub et al. |
| 2016/0315969 A1 | 10/2016 | Goldstein |
| 2017/0083867 A1 | 3/2017 | Saxena et al. |
| 2017/0270128 A1 | 9/2017 | Smith et al. |
| 2018/0048460 A1 | 2/2018 | Goldstein |
| 2018/0192288 A1* | 7/2018 | Sachtjen ............... H04W 12/06 |
| 2018/0302446 A1 | 10/2018 | Goldstein |
| 2018/0332065 A1 | 11/2018 | Gupta et al. |
| 2019/0014180 A1 | 1/2019 | Lawson et al. |
| 2019/0028832 A1 | 1/2019 | Speede |
| 2019/0171984 A1* | 6/2019 | Irimie ............... G06Q 10/0635 |
| 2021/0067559 A1* | 3/2021 | Coleman ................ H04L 63/20 |
| 2021/0092118 A1 | 3/2021 | Zahed |
| 2021/0152610 A1* | 5/2021 | Fryback ............... H04L 63/205 |
| 2021/0226951 A1 | 7/2021 | Goldstein et al. |
| 2022/0086158 A1 | 3/2022 | Thirumavalavan |

FOREIGN PATENT DOCUMENTS

| | | |
|---|---|---|
| EP | 3826264 A1 | 5/2021 |
| WO | WO 2014/131058 A2 | 8/2014 |

OTHER PUBLICATIONS

Andersen, K. et al., "The Authenticated Received Chain (ARC) Protocol," Internet Engineering Task Force (IETF), Request for Comments: 8617, Jul. 2019, 35 pages, ISSN: 2070-1721.

European Patent Office, Extended European Search Report, European Patent Application No. 21206991.8, Apr. 28, 2022, seven pages.

Kucherawy, M. et al., "Domain-based Message Authentication, Reporting, and Conformance (DMARC)," Request for Comments: 7489, Mar. 2015, 73 pages, ISSN: 2070-1721.

PCT International Search Report and Written Opinion, PCT Application No. PCT/US2021/014481, May 3, 2021, 10 pages.

PCT International Search Report and Written Opinion, PCT Application No. PCT/US2021/014483, May 3, 2021, 10 pages.

Russell, D. "Access Control for Dynamic Virtual Organisations." Electronic Proceedings of the UK E-Science All Hands Meeting, Jan. 1, 2004, pp. 1-8.

* cited by examiner

Delivered-To: John.doe@example.com
Received: by 2002 : aa6 : cb4b : 0 : b0 : 203 : 870d: 2faa with SMTP idh11csp26039031kt;
    Tue, 16 Aug 2022 10:15:26 -0700 (PDT)
X-Google-Smtp-Source: AA6agR67i25khY80pMPquHxaq0jKqnQCXomDBQUARK6pGddwmt483mFbRU39+oqvkti5ZZH4PXZn
X-Received: by 2002 : ac8 : 5d49:0:b0:343:65cd:fa02 with SMTP id g 9 - 20020ac85d490000000b0034365cdfa02mr18857326qtx.215.1660670125993;
    Tue, 16 Aug 2022 10:15:25 -0700 (PDT)
ARC-Seal: i=l; a=rsa-sha256; t=1660670125; cv=none;
    d=google.com; s=arc-20160816;
    b=wY+5Ll936Lb5oM/vchQHzqMIAtp7THrmoP+wY8aTT8qZss8WcuP9TiiGRbiaaKzElc
    VjzE9xgSbDMVDP9C0f016uDMBA8WjE4noboNgGj7Vkzqb6qJtyvUvpsErr0hlBQ9Ug
    Kz9jHAgtdrX0Wcjwm03+5QdJGsKk3DJlGa9C77PbHlinpHczx9rT6W7Wyznf/GPkGe5
    EHknEGY3mPiDji1n1+PdSxOuvN2GpilnDu4/moKK5454GTYrS8frFNvGaywkmXSn0Vvx
    Xp90AnH9T3H6osBsenEwkMzOY31OHc5vQ/4VUmu7c8rgtUm6MQA/EoKy1Aa063TTHNnJ
    ovfQ--
ARC-Message-Signature: i=1; a=rsa-sha256; c=relaxed/relaxed; d=google.com; s-arc-20160816;
    h=list-id:feedback-id:list-unsubscribe:list-unsubscribe-post
    :mime-version:subject:message-id:to:reply-to:from:date
    :dkim-signature:dkim-signature;
    bh=6GvKPWWkXgbcdCsm9k1p1LABiiB1B8qcYsvU3AoVi/o=;
    b=1AdPQESJ3AfAZwiD9lMeqWD4Sf5MQEMd1c7/06FQFq01H10ur8ajcK25FTjH1fTx74
    ofXKbcNlq8mV2+7dEBtsnPd1kfdzr110jFpWjMSekuVaBF4GzX09VvRL8qDhh4Uw8uz
    pn9NzNk20oOlnAJtVo/PPha3PxTfzGlinJJLJcz9by4D12x1yujT1WWi/iA3Pk98T3x/l
    aNHQzKcGknEXHliiSpQe7tlzimPjRec7s0+O9g91qfrxM1FlDBzxN0M3ojD2lhs1hB
    s+V7FFwnewbfSZCECrbEya8HuxGoC5JAwFq+D4DeLPheaXG3LYxo2QEbblrCPLFF304y
    1xbw==
ARC-Authentication-Results: i=1; mx.google.com;
    dkim=pass header.i=@willdom.io header.s=pem header.b=stQJtZtQ;
    dkim=pass header.i=@mail3067.pemsv30.net header.s=perfit header.b=oToWphQ3;
    spf+pass (google.com: domain of b-willdom-mail_c16wg40y6bc420738eiot5ssa-4dfa6b-p@mail3067.pemsv30.net designates 15.235.30.67
    as permitted sender)
    smtp.mailfrom=b-willdom-mail_c16wg40y6bc420738eiot5ssa-4dfa6b-p@mail3067.pemsv30.net;
    dmarc=pass (p=NONE sp=NONE dis=NONE) header.from=willdom.io
Return-Path: <b-willdom-mail_c16wg40y6bc420738eiot5ssa-4dfa6b-p@mail3067.pemsv30.net>
Received: from mail3067.pemsv30.net (mail3067.pemsv30.net. [15.235.30.67])
    by mx.google.com with ESMTPS id gb4-20020a05622a598400b0003445f60aba0si3480579qtb.105.2022.08.16.10.15.25
    for <John.doe@example.com>
    (version=TLSl_3 cipher=TLS_AES_256_GCM_SHA384 bits=256/256);
    Tue, 16 Aug 2022 10:15:25 -0700 (PDT)
Received-SPF: pass (google.com: domain of b-willdom-mail_c16wg40y6bc420738eiot5ssa-4dfa6b-p@mail3067.pemsv30.net designates 15.235.30.67 as permitted sender)
client-ip=15.235.30.67;

FIG. 2B

Authentication-Results: mx.google.com;
    dkim=pass header.i=@willdom.io header.s=pem header.b=stQJtZtQ;
    dkim=pass header.i=@mail3067.pemsv30.net header.s=perfit header.b=oToWphQ3;
    spf=pass (google.com; domain of b-willdom-mail_c16wg40y6bc420738@eiot5ssa-4dfa6b-p@mail3067.pemsv30.net designates 15.235.30.67 as permitted sender)
smtp.mailfrom=b-willdom-mail_c16wg40y6bc420738@eiot5ssa-4dfa6b-p@mail3067.pemsv30.net
    dmarc=pass (p=NONE sp=NONE dis=NONE) header.from=willdom.io;
DKIM-Signature: v=1; a=rsa-sha256; q=dns/txt; c=relaxed; d=willdom.io;
  s=pem; h=List-ID:Feedback-ID:List-Unsubscribe:Content-Type:MIME-Version: Subject:Message-ID:To:Reply-To:From:Date:Sender:Cc:Content-Transfer-Encoding:
Content-ID:Content-Descripton:Resent-Date:Resent-From:Resent-Sender: Resent-To:Resent-Cc:Resent-Message-ID:In-Reply-To:References: List-Help: List-Subscribe:List-
Post:List-Owner:List-Archive; bh=6GvKPWWkXgbcdCsm9k1p1LABiiB1B8qcYsvU3AoVi/o=; b=stQJtZtQqMbdYZ8QdXz1mOXG6G
7Uw4DkqiHLa7Fx4r3tWG9xhEqqObUfHvd7JGMUXjmo1R88vESTvnVUHAT8B8iMsa3f0+ey/jGQEgz 7OCVdx4phVvIW3uj9bD11zCMBu3F
zmem1QneQNUeCOJKL9LuvqByrvPz36Su/PXGusY=;
DKIM-Signature: v=1; a=rsa-sha256; q=dns/txt; c=relaxed/relaxed; d=mail3067.pemsv30.net; s=perfit; h=List-ID:Feedback-ID:List-Unsubscribe: Content-Type:MIME-Version:Subject:Message-ID:To:Reply-To:From:Date:Sender:Cc: Content-Transfer-Encoding:Content-ID:Content-Description:Resent-Date:
Resent-From:Resent-Sender:Resent-
To:Resent-Cc:Resent-Message-ID:In-Reply-To: References:List:-Help:List-Subscribe:List-Post:List-Owner:List-Archive: bh=6GvKPWWkXgbcdCsm 9k1LABiiBIB8qcYsvU3AoVi/o=;
b=oToWphQ3Kq4aJxtMIFcCHZjeak QhuVpt1AQw5ZUR5wFFTTMRG5qT40Xq05dgX4LEyiUvOcwnoJ2JkYMqaZ7chU3194Mt9jbbS9k2nX2
yE6xo5urlKVWc1ceoxFcN4pfSwp+Q6btxxfgGqJRNzIPmopsEwsjvRJtaUwbaPtPAcl8=;
Date: Tue, 16 Aug 2022 17:15:25 +0000 (UCT)
From: Martin Joe <martin.joe@acme.io>
Reply-To: Martin Joe <martin.joe@acme.io>
To: John Doe <.John.doe@example.com>
Message-ID: <ant-willdom_bulk_278.mail_c16wg40y6bc420738eiot5ssa.john.doe=example.com-ho@example.com>
Subject: In thread
MIME-Version: 1.0
Content-Type: multipart/alternative; boundary="----_Part_44540592_1913127988.1660670125368"

FIG. 2C

Failing Senders Report ⓘ

Valimail uses Helios to identify the mailboxes within the organization who have received the most emails from failing senders. Use this information to determine whether or not to authorize or deny services whose owner is unclear.

Failing Senders: Any ▾    Domains: Any ▾    Received Date: LAST 30 DAYS ▾    APPLY

| Failing Senders | Domains | Message Count ⓘ ▾ | Internal Recipients |
|---|---|---|---|
| SaaS Company A | saascoa.com | 1,745,826 | View Full List |
| Constant Contact | realestateco.com | 288,364 | View Full List |
| Proofpoint Hosted | mediaco.com | 44,945 | View Full List |
| LanTrax | realestateco.com | 6,545 | View Full List |
| JotForm | realestateco.com | 6,107 | View Full List |
| Medical Transportation Management | techno.com | 5,898 | View Full List |
| SaaS Company B | saascob.com | 5,062 | View Full List |
| Emma | realestateco.com | 3,377 | View Full List |

FIG. 3C

Failing Senders

Internal Recipients (top or full list)
SES Service

| Internal Recipients | Failed Email Volume |
|---|---|
| Tiffany@acme.com | 753 |
| John@acme.com | 22 |
| Jason@acme.com | 45 |

FIG. 3D

Email Insights Report ⓘ
Use this feature to understand why your messages failed to authenticate.

| Recipient Domain | From Domain | Sending Service | Received Date |
|---|---|---|---|
| Any ▸ | Any ▸ | Any ▸ | LAST 30 DAYS ▸ APPLY |

John Z 

| Recipient Domain | From Domain | SPF Results | DKIM Results | Sending Service | Source IP | Authentication Headers | Received Data Header | Message Count |
|---|---|---|---|---|---|---|---|---|
| mediaco.com | saasco.com | Failing None school.ti | Failing None saasco.ti | Emma | 120.64.162.124 | View Headers | 07/17/2023 | 280 |
| saascoa.com | elogua.com | Failing None school.ti | Failing None saasco.ti | saasco | 15.74.253.83 | View Headers | 07/17/2023 | 683 |
| defendmy.email | mailchimp.com | Failing None school.ti | Failing None saasco.ti | Baynet World | 100.124.12.144 | View Headers | 07/17/2023 | 261 |
| legalco.com | emma.com | Failing None school.ti | Failing None saasco.ti | Constant Contact | 120.64.162.124 | View Headers | 07/17/2023 | 537 |
| mediaco.com | saasco.com | Failing None school.ti | Failing None saasco.ti | LanTrax | 15.74.253.83 | View Headers | 07/17/2023 | 359 |
| saascob.com | elogua.com | Failing None school.ti | Failing None saasco.ti | Emma | 100.124.12.144 | View Headers | 07/17/2023 | 163 |

FIG. 3E

Authentication Header ⓘ
An authentication header will show you exactly who is sending email using your domain.

MESSAGE INFO

Domain: saasco.com
Sender: Emma
Messages: 280
Received Date: 08/16/23

DATA RESOURCES

Access the raw email header to see more information. If you are an admin through your domain you can deep link into a failed email for more details

VIEW RAW HEADER

VIEW A FAILED EMAIL

RETURN-PATH

The Return-Path shows the address of the mailbox that caused the message to be sent. The domain in the mailbox is the SPF domain for the message.

Return Path: @microsoft.com

CLAIMED MESSAGE SENDER

This is sometimes, but not always, identical to the Return-Path mailbox.

From: microsoft.com

MESSAGE RECIPIENT

This is the address of the mailbox that the message was retrieved from.

recipient.com

Hidden Header
These headers are part of the message but are not typically viewed without special action on the part of the recipient.

AUTHENTIC RESULTS ⓘ spf =pass (sender IP is 157.55.254.216) smpt.mailfrom= Microsoft.com;dkim=pass (signature was verified) header.d= Microsoft.com;dmarc=pass action=none header.from=microsoft.com;compauth=pass reason=100

DKIM SIGNATURE ⓘ v=1;a=rsa-sha256;d=microsoft.com;s=s1024-meo;c=relaxed/relaxed.i=microsoft-noreply@microsoft.com.t=168 1102196;h=from;subject:date:messaged-id:to:mime-version:content-type;bh=xcr4SRFEJ4ExmJT/ sCCgwwErKaUH25e23sWVuxMcVg=;b=brynGqru6h9O50/A6CRpE3hfBcD7#0ChWkdQULVaWqm3iYCQ/yYcg/ cihDMl9ZKBztKXVZqxwLRmOhgrtzkk1rxZGcJMqxkCp8c2hfaEpQle611141$ sage-ki to mime-Nelson ccetentaypeRmascreSRFEJ4EsreJT/sCCowaErKsUlil25ah3sWVIANicVga.bablynGiarubh9050/ AOCRRE3nOtoD7E0GhWlDlCHlLVaWom3iYGO/sYcgicADSAlSZKBitaXVInav wLRmOngricklrt ZGcJragakCpacghfelEpOler6A91 icZENig8L4ROurfaRT80046hUvrElleADOrnfAFPoPm108Fiti48 hoSM011=

FIG. 3F

Authentication Headers

Detailed information of DKIM, DMARC and SPF results.

-- authentication-results 
spf=pass (sender IP is 157.55.254.216)
smtp.mailfrom=microsoft.com; dkim=pass (signature was verified)
header.d=microsoft.com;dmarc=pass action=none
header.from=microsoft.com;compauth=pass reason=100

-- received-spf:
Pass (protection.outlook.com: domain of microsoft.com
designates 157.55.254.216 as permitted sender)
receiver=protection.outlook.com;client-ip=157.55.254.216;
helo=waws-prod-ch1-010f4569.cloudapp.net; pr=C -- dkim-signature
v=1; a=rsa-sha256; d=microsoft.com; s=s1024-
meo;c=relaxed/relaxed; i=microsoft.noreply@microsoft.com;
t=1681102896;h=from:subject:date:message-id:to:mime-
version:content-
type;bh= 1py3bPKPbePCmMziH13AZqw0Fa +/
wnOTcnp6P-ZLMW2SwMpgo=;b=1yc9n5JU-
7bTkT9FxgIYFJutPbxbyfsBXIbD4wJ-Mdt8/15vjYvl2-
lICipp_FFTkyd3s_yA4jX65vRSsaE2hBhTw
okQIHsBTfmTFEEo01BtmUZpR5M4Mtz5Q8LE97YRDE -- raw-message
Received: from BL2PRD0711HT001.namprd07.prod.outlook.com
(10.255.104.164) by
 BY2PRD0711HT003.namprd07.prod.outlook.com
(10.255.88.166) with Microsoft SMTP
 Server (TLS) id 14.16.257.4; Thu, 17 Jan 2013 23:35:35 +0000
Received: from BL2PRD0711HT002.namprd07.prod.outlook.com
(10.255.104.165) by
 BL2PRD0711HT001.namprd07.prod.outlook.com
(10.255.104.164) with Microsoft
 SMTP Server (TLS) id 14.16.257.4; Thu, 17 Jan 2013 23:35:34
+0000
Received: from TX2EHSMHS007.bigfish.com (unknown
[10.9.14.242]) by mail240-tx2.bigfish.com (Postfix) with ESMTP id
675424200E7 for <jerryp@mail.unomaha.edu>; Thu, 17 Jan 2013
23:35:31 +0000 (UTC)
Received: from bf.shako.com.tw (59.125.100.113) by
TX2EHSMHS007.bigfish.com
 (10.9.99.107) with Microsoft SMTP Server (TLS) id 14.1.225.23;
Thu, 17 Jan
 2013 23:35:28 +0000
Authentication-Results: spf=pass (sender IP is 209.85.222.48)
smtp.mailfrom=microsoft.com; dkim=pass (signature was verified)

FIG. 3G

Follow these steps to view a Failed Email

LEARN MORE

1. Copy the Message-ID:

<e599483f-3782-4a3d-906b-4b3be2c555ad@az.northcentralus.production.microsoft.com>

2. Paste the Message-ID into your MSP instance while logged in as admin.

FIG. 3H

MSP Connection

Choose to connect one of your Mailbox Service Providers for additional visibility of your inbound email authentication.

Connected MSP

| CONNECTED MICROSOFT | GOOGLE WORKSPACE |

Learn about connecting to Microsoft O365 or Google Workspace

FIG. 3I

AUTOMATED EMAIL PROTOCOL ANALYZER IN A PRIVACY-SAFE ENVIRONMENT

CROSS REFERENCE TO RELATED APPLICATION

The application claims the benefit of U.S. Provisional Application No. 63/407,166, filed on Sep. 16, 2022, which is incorporated by reference herein for all purposes.

BACKGROUND

In the modern digital landscape, email communication has emerged as a ubiquitous means of interaction, both within and outside large organizations. However, the management of email authentication and the identification of failing senders have posed challenges for these entities. Large organizations, with extensive email infrastructures, often grapple with the intricacies of email authentication protocols. The complexity of these systems can confound even the most seasoned IT professionals, leading to misconfigurations and vulnerabilities that malicious actors exploit for phishing and spoofing attacks.

Furthermore, the task of identifying failing senders within a voluminous stream of emails demands significant resources and expertise. Legacy systems may lack the sophisticated tools needed to sift through vast quantities of data effectively. In summary, the intricate nature of email authentication and the challenge of managing failing senders represent obstacles for large organizations. Resolving these issues is important not only for bolstering security but also for maintaining the seamless flow of communication, trust, and integrity.

BRIEF DESCRIPTION OF THE DRAWINGS

FIGS. 2B and 2C are example headers of a message, in accordance with some embodiments.

FIG. 3C is a conceptual diagram of a graphical user interface that presents the result of the determination of the secure server based on data that has personalized information largely removed, in accordance with some embodiments.

FIG. 3D is an example graphical user interface that illustrates an onboarding process where a domain owner may provide authorization to the computing server to connect with a mailbox service provider.

FIG. 3E is a conceptual diagram of a graphical user interface that displays an email insights report, in accordance with some embodiments.

FIG. 3F is a conceptual diagram of a graphical user interface that provides additional header information of a failing email, in accordance with some embodiments.

FIG. 3G is a conceptual diagram of an example interface of the software platform that allows an administrator of the domain owner to review the header information, in accordance with some embodiments.

FIG. 3H is a conceptual diagram of a graphical user interface that displays the Message-ID of a failed email, in accordance with some embodiments.

FIG. 3I is a conceptual diagram of a graphical user interface that displays an onboarding process for a domain owner to authorize the computing server to access email data, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
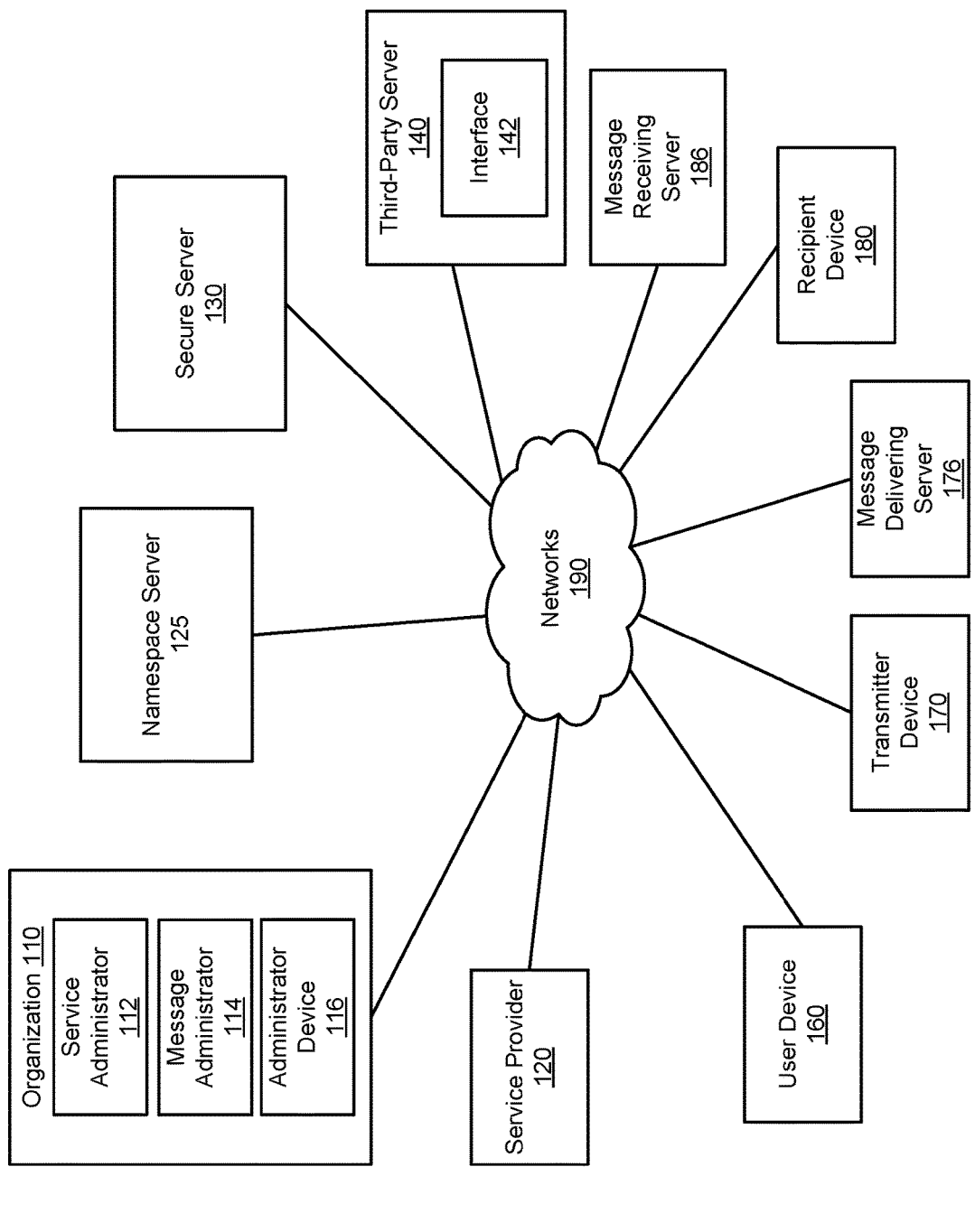
FIG. 1 is a block diagram of an example system environment, in accordance with some embodiments.

Example System Environment:

Referring now to figure (FIG. 1, shown is a block diagram illustrating an example system environment 100 of secure message analyzer, in accordance with some embodiments. The system environment 100 may include an organization 110, a service provider 120, a namespace server 125, a secured server 130, a third-party server 140, a user device 160, a transmitter device 170, a message delivering server 176, a recipient device 180, a message receiving server 186, and networks 190. In various embodiments, system 100 may include different, additional or fewer components and entities. Also, in some situations, certain components' roles may overlap. For example, the user device 160 may be a transmitter device 170 or a recipient device 180, depending on the situation. Likewise, an organization 110, the secure server 130, and the third-party server 140, depending on their role, each may also be a service provider 120. The functionalities of each element may be distributed differently among the elements in various embodiments.

While some of the components in the system environment 100 may at times be described in a singular form while other components may be described in a plural form, the system environment 100 may include one or more of each of the components. For simplicity, multiple instances of a type of entity or component in the system environment 100 may be referred to in a singular form even though the system may include one or more such entities or components. For example, in one embodiment, while the organization 110 may be referred to in a singular form, the secure server 130 and third-party server 140 may serve multiple organizations 110. Likewise, while the outside service provider 120 may be referred to in a singular form, each organization 110 likely engages with multiple outside service providers 120. Conversely, a component described in the plural form does not necessarily imply that more than one copy of the component is always needed in the environment 100.

An organization 110 may be any suitable entity such as a government entity, a private business, a profit organization, or a non-profit organization. An organization 110 may define an environment in which a group of devices organizes and perform activities and exchange information. For example, an organization 110 may be a company or a subsidiary of a company. The system environment 100 may include multiple organizations 110, which may be customers of the secure server 130.

A service provider 120 provides services to the organization 110. In some embodiments, the service provider 120 may be an outside service provider 120 such as another organization that provides services to the organization 110. In some embodiments, the service provider 120 may also be an internal service provider, such as another division of a company. Examples of services may include email services, email authentication services such as SPF (Sender Policy Framework), DKIM (DomainKeys Identified Mail), DMARC (Domain-based Message Authentication, Reporting & Conformance) reports, hosted or on-prem mailboxes for emails, Internet security services, accounting services, human resources and payroll services, banking and financial services, sales, and marketing services, subscription services, and any other suitable services including any software-as-a-service (SaaS) platforms. An organization 110 may receive different services from various service providers 120. Each service provider 120 may provide service to different organizations 110.

Oftentimes, as part of the service provided by a service provider 120, the service provider 120 may send various different kinds of emails to an organization 110, including actual human communications, administration emails, reminder emails, promotional emails, etc. In some cases, some of the emails sent from the service provider 120 may fail one or more email protocols, such as authentication protocols like SPF, DKIM, and DMARC. This could be due to one or more emails not properly set up by the service provider 120, wrong addresses (e.g., the recipient is no longer with the organization 110), malicious parties pretending to be the service provider 120, etc. For a larger organization 110 such as an organization with 100 or more employees, even though an IT personnel of the organization 110 may be aware of the failing issue of the service provider 120, it may not be clear to the IT personnel who the internal contact of the organization 110 is to contact the service provider 120. For example, one service provider 120 may be hired by an IT department of the organization 110, another service provider 120 may be hired by the legal department, and the third service provider 120 may be hired by the sales department. There may not be a clear record within an organization 110 to indicate who the administrator should contact within the organization 110 to report the issues with the service provider 120. Embodiments provide one or more ways to identify internal recipients within the organization 110 who are more likely to lead to the contact with the organization 110, as further discussed in various embodiments below.

An organization 110 may include different resources under its control. Some of the resources may be associated with various services provided by different service providers 120. The organization 110 may use different service administrators 112 to manage those services. A service administrator 112 who manages a service may be referred to as the owner, the manager, or the administrator of the service. An administrator may operate an administrator device 116 and may be associated with an email address such as the employee email address. In an organization 110, such as a large corporation with tens of thousands of employees, hundreds of services may be managed by different teams of administrators 112. In some embodiments, while some of the administrators 112 are employees, other administrators 112 may be outsourced or subcontracted. Even the organization 110 may not have complete documentation with respect to who the administrators are for what services. It has become increasingly challenging for an organization 110 to determine the responsible administrators within the organization 110 for a particular service.

An example of service administrator 112 is a message administrator 114 (e.g., email administrator) who manages the mailbox server for an organization 110 and various authentication procedures, policies, and management reports related to message exchanges (e.g., email exchanges) of various people of the organization 110, such as any email protocol checks. The message management reports may be generated based on the results of protocol checks, such as email protocol checks. The types of message management reports used may depend on the type of messages being transmitted. For example, in the context of emails, the protocol checks may be in one or more established standards such as SPF (Sender Policy Framework), DKIM (DomainKeys Identified Mail), DMARC (Domain-based Message Authentication, Reporting & Conformance), BIMI (Brand Indicators for Message Identification), TLS-RPT (Transport Layer Security Reporting), DANE (DNS-based Authentication of Named Entities). An email protocol check may also include checking recipients of emails and whether the recipient address exists (e.g., an employee may have left and the email address no longer exists). In other contexts, the type of message management report may be in compliance with other protocols that are in various layers such as the application layer, transport layer, or Internet layer. A message administrator 114 may review those types of message management reports.

The message management reports may be used for the authentication of messages. Using email exchange as an example, a malicious party may pretend to be associated with the organization 110 and send an email under the domain of the organization 110. To prevent this from happening, the organization 110 may set forth one or more sender policy framework (SPF) policies and domain keys identified mail (DKIM) policies to specify how emails associated with the domain should be authenticated. An email recipient server may receive various emails that bear a sender domain but are in fact sent from different parties that are not affiliated with the domain owner of the sender domain. The email recipient server may generate a DMARC report that records the identities of devices that purportedly sent emails from the sender domain and transmit the DMARC report to an address that is specified in the DMARC record.

A message administrator 114 may monitor the status of various message management reports and attempt to follow up with other administrators 112 regarding service providers 120 with frequently failed messages such as frequently failed emails sent to an organization 110 that bear the domain name of the service provider 120. However, in some cases particularly in a large organization 110, the message administrator 114 may not know the identities of the service administrators 112 with the organization 110 who are responsible for the service providers 120 with frequently failed messages because this may not be immediately apparent which team in a large organization 110 is responsible to retaining a service from a service provider 120. Various embodiments described herein provide examples of ways for a message administrator to find contacts that may effectively lead to the true administrator for a service provider 120. For example, IT/security professionals of a complex organization need help identifying owners of failing services in order to properly authorize those services quickly. As an IT/security professional, to rapidly authorize or deny services whose owner is unclear, the professional wants to understand the top 3 internal recipients who are sent mail by the service.

In system environment 100, there can be multiple independent organizations 110. Various organizations 110 may be of different natures and provide different products and services to their customers. The organizations 110 may be customers of the secure server 130 and the third-party server 140 and may delegate the third-party server 140 to perform one or more tasks to various extents. Each organization 110 may specify a different set of rules and policies in controlling how the third-party server 140 behaves when performing the delegated tasks. The rules and policies may be related to authentication and authorization.

A namespace server 125 is a server that manages the namespace records (e.g., domain name system (DNS) records) of an entity. In some embodiments, various organizations 110 and service providers 120 (which may also be organizations 110) each may be associated with its own namespace such as a domain (example.com). Each of the organization 110 and service provider 120 may be referred to as a domain owner. Some of the resources may be associated with a unique identifier under the namespace of the domain owner. For example, a device (e.g., an IoT device) or an account (e.g., an email account) under the control of the domain owner having a domain example.com may have a DNS identifier (device1.example.com or email_address@example.com) for identification purposes. Each domain owner may be associated with its own namespace server 125.

To manage its namespace, a domain owner may use a namespace server that may be controlled directly by the domain owner or be delegated to be managed by another party such as the service provider 120, the secure server 130 or the third-party server 140. In some embodiments, only a section of the namespace is delegated to the third-party server 140. A namespace server can be a domain owner DNS server. For example, the namespace server may BIND (Berkeley Internet Name Domain) server. The namespace server operates the namespace (e.g., the domain) of the domain owner. For example, DNS is a distributed system that includes many parties working together to provide a cohesive namespace for the Internet. Starting from the root servers, each branch of the DNS is controlled by a party that may delegate sub-sections of the namespace to other parties. A namespace associated with a domain owner may store DNS records for use in a DNS system, manage the namespace for the domain name associated with the domain owner, delegate one or more sub-domains to other servers that can be authoritative, and answer queries about the namespace of the domain. A namespace may store multiple DNS records for a particular domain, such as an A record (address record), MX record (mail exchange record), and so on.

By way of example, a domain owner named "Example Corp" that operates various accounts and/or devices may have a website located at www.example.com. The "com" portion of the namespace is maintained by a top-level domain nameserver, which delegates (via a name server (NS) record) the management of the namespace "example.com" to Example Corp. Example Corp is responsible for maintaining the records under example.com, including www.example.com. Since the namespace may be many layers deep, Example Corp may organize its device identities under a specific branch of the DNS, such as "_devices.example.com". A pattern for identifying devices by serial and model, organized under the namespace example.com, may be serial.model._devices.example.com, or 123.sensor._devices.example.com.

In some embodiments, a domain owner may divide different branches of its namespace for different types of entities and devices. For example, natural persons may be under the namespace_persons.example.com while devices are under the namespace_devices.example.com. In another approach, the named entities may be assigned to a single branch, such as authentication.example.com. The wording used in the namespace can be arbitrary and does not always need to correspond to or have any relationship with the type of the device.

In some embodiments, the DNS server for a particular domain owner stores a DNS record specifying an email protocol policy. DNS provides various types of records, including name-to-IP address resolution. DNS also has the ability to host specialized record types for public keys and certificates (DANE (DNS-based Authentication of Named Entities) or TLSA (transport layer security authentication) record type, RFC 6698). DKIM (Domain Keys Identified Mail) (RFC 6376) is another type of record that puts public keys in freeform TXT records. DNS records may also include a Sender Policy Framework (SPF). Another example of a DNS record may include a Domain-based Message Authentication, Reporting and Conformance (DMARC) record. A DMARC record may include a version field, a policy field that specifies an email protocol policy (e.g., none, quarantine, reject, etc.), DMARC alignment options, authentication methods (e.g., SPF, DKIM), RUA filed for regular reports and RUF field for forensic reports.

A secure server 130 is a computing server that may have a heightened security standard and an isolated environment for connecting with an organization 110 and reviewing data of the organization 110 that may include personally identifiable information or other sensitive information, such as email data. In some embodiments, the secure server 130 may receive data from the organization 110 directly or from another party such as a mailbox service provider of the organization 110. For example, the secure server 130 may receive authorization from a domain owner to gain access to the email data of the domain owner. The email data may be hosted by a mailbox service provider on behalf of the domain owner. The secure server 130 may establish a connection with a mailbox provider to receive message data such as the email data of the organization 110. The extent of information received by secure server 130 may depend on the agreement between organization 110 and the secure server 130. For example, in some embodiments, the secure server 130 may receive only certain header fields of the message data. Alternatively, or additionally, the secure server 130 may receive the entire headers of the message data. Alternatively, or additionally, the secure server 130 may also receive the body of the messages such as the content of the emails. Alternatively, or additionally, the secure server 130 may also receive reports such as message management reports that may or may not contain some or all of the content of the messages. The secure server 130 may analyze the message data to determine one or more mailbox identifiers that are associated with one or more administrators of the organization 110. The secure server 130 may output the determination and aggregation of data without revealing any personally identifiable information (e.g., the content of the emails). In some embodiments, the secure server 130 may analyze the message data of an organization 110 and identify the service administrators 112 for various services of the organization 110. The output of the secure server 130 may be sent to the third-party server 140, directly to the organization 110, or to another suitable destination.

In some embodiments, an organization 110 may integrate certain processes or services provided by the secure server 130 via various suitable ways. In some embodiments, an application programming interface (API) allows the secure server 130 to inspect some of the messages, such as emails, directed to or in transit in the organization 110 and enables the secure server 130 to apply various policies after analyzing the messages. In some embodiments, the API may provide access to the secure server 130 for all contents of the messages or for only part of the data of the messages. In some embodiments, an API may be used with a restricted scope that does not provide any personally identifiable information. In some embodiments, the integration may include in-line processing of emails. In some embodiments, the integration may include receiving reports such as message management reports from third parties. In some embodiments, the secure server 130 may receive data directly from the organization 110 through one or more suitable ways, such as through API payload delivery, daily reports, etc.

The third-party server 140 is a computing server that provides various services on behalf of the organization 110. The third-party server 140 may be one of the service providers 120 of the organization 110. The third-party server 140 may also be referred to as a delegated server, a computing server, a third-party service provider, or 3PSP. The term "third party" may be viewed from the perspective of the organization 110, which may delegate certain tasks and services to another company (a third-party company), which has the expertise to perform the tasks and services. For example, the organization 110 may be a customer of the third-party server 140. The services provided by the third-party server 140 may include managing policies for an organization 110, recommending new policies to an organization 110, authentication responses on behalf of organizations 110, policy distribution on behalf of organizations 110, and other suitable tasks. Various services provided by the third-party server 140 may take the form of SaaS (Software as a Service).

A message administrator 112, who may be responsible for managing the email policies for the organization 110, may receive statistics and analyses on emails on certain service providers 120 that frequently fail one or more email policies from the third-party server 140. The modes of notifications from the third-party server 140 may vary, depending on the situation. For example, the third-party server 140 may display the information on the SaaS platform that is provided to the service administrators 112. The third-party server 140 may also transmit the information through an API communication. In some embodiments, the third-party server 140 may also report the information by messaging (e.g., emailing) the service administrators 112.

Figure 5:
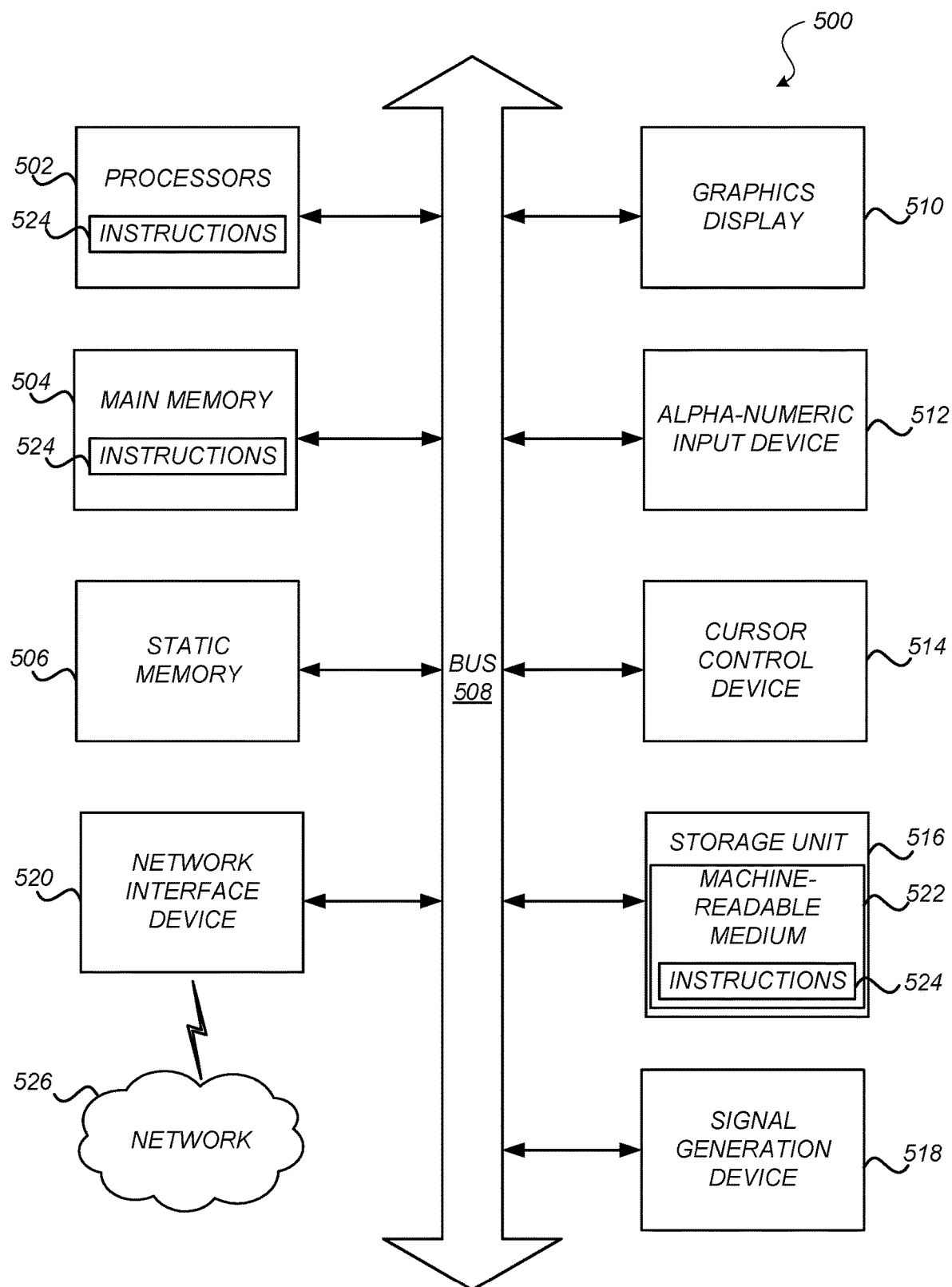
FIG. 5 is a block diagram illustrating components of an example computing machine, in accordance with some embodiments.

Some or all of the components and hardware architecture of a secure server 130 and a third-party server 140 are illustrated in FIG. 5. The secure server 130 or third-party server 140 may be a server computer that includes software that is stored in memory and one or more processors (general processors such as CPUs, GPUs, etc.) to execute code instructions to perform various processes described herein. The third-party server 140 may also be a pool of computing devices that may be located at the same geographical location (e.g., a server room) or be distributed geographically (e.g., cloud computing, distributed computing, or in a virtual server network).

The interface 142 may be an interface of the third-party server 140 for another entity to communicate with the third-party server 140. For example, the third-party server 140 may provide a software system for the organization 110 to manage various email authentication settings and review results generated by the secure server 130 and/or third-party server 140. Examples of the graphical user interface elements of the front-end interface 142 are shown in various figures below. The interface 142 may take different forms. In one embodiment, the interface 142 may control or be in communication with an application that is installed in a user device 160. For example, the application may be a cloud-based SaaS or a software application that can be downloaded in an application store (e.g., APPLE APP STORE, ANDROID STORE). The interface 142 may be a graphical user interface of a front-end software application that can be installed, run, and/or displayed on a user device 160. The interface 142 also may take the form of a webpage interface of the third-party server 140 to allow service administrators 112 to access data and results through web browsers. In some embodiments, the interface 142 may not include graphical elements but may provide other ways to communicate with message publishers 120, such as through APIs. The API may be in compliance with any common API standards such as Representational State Transfer (REST), query-based API, Webhooks, etc. The data transferred through the API may be in formats such as JSON and XML.

The third-party server 140 may maintain a namespace zone that is delegated by an organization 110. The namespace zone may be referred to as a delegated namespace zone (e.g., a DNS zone). The delegated namespace zone may be a section of the namespace (e.g., namespace under DNS). The third-party server 140 provides management and maintenance of that section of the namespace. An example delegated namespace zone may be a delegated DNS zone that is hosted by the third-party server 140 on behalf of the organization 110. For example, an organization 110 with the domain "example.com" may delegate the zone of "devices.example.com." to the third-party server 140 for the third-party server 140 to manage the identity records of certain devices of the organization 110. In some embodiments, an organization 110 may delegate the management of various DNS records to the third-party server 140 under a namespace zone.

The third-party server 140 may manage message policies for an organization 110 and provide various message management reports for the organization 110, such as SPF, DKIM, and DMARC. The third-party server 140 may determine rules for various participants in an application environment related to the organization 110. The third-party server 140 may identify new devices and entities and automatically determine the potential rules that should apply to those new devices. A policy may be defined and initiated by an organization 110. A policy related to how devices interact with each other may be referred to as an interaction control policy. An organization 110 may transmit the policy setting to or configure the policy setting at the third-party server 140.

U.S. Patent Application Publication No. US2021/0226951, entitled "Automated Authentication and Authorization in a Communication System," published on Jul. 22, 2021 and U.S. Pat. No. 9,762,618, entitled "Centralized Validation of Email Senders via EHLO Name and IP address Targeting," patented on Sep. 12, 2017, are incorporated by reference for all purposes.

In some embodiments, the secure server 130 and third-party server 140 may be operated by the same entity but the secure server 130 may be an isolated environment with a heightened security standard. For example, the data maintained by the secure server 130 may be isolated from the third-party server 140. The algorithms associated with the secure server 130 may also be hosted in a separate Cloud environment that has a different security standard than the third-party server 140. In some embodiments, the secure server 130 may also have a firewall requirement that is more stringent than the third-party server 140.

In some embodiments, the secure server 130 may not exist in the same environment as, or with an open network to, the third-party server 140. In some embodiments, the secure server 130 may also avoid existing in any other broad area attack surfaces. For example, if third-party server 140 is compromised, there is no direct access to the secured database or other raw information source in the secure server 130. In some embodiments, the secure server 130 may only be able to access the mailbox information provider and the third-party server 140 in the most minimal way for functionality. In some embodiments, the secure server 130 does not persist email addresses or other potentially publicly identifying (e.g., data that if made public could be used to target a specific person) or private (e.g., confidential/personal/business data) information from the headers such as subject lines in either plaintext or encrypted formats.

In some embodiments, the role of the secure server 130 may be replaced by the third-party server 140, or vice versa. For example, in some embodiments, an entity operating the third-party server 140 may decide not to set up a secure server to perform the tasks discussed in this disclosure. In this disclosure, the features, roles, and processes of the secure server 130 may be equally applied to the third-party server 140, and vice versa. The roles of the two servers may be combined and each one of them or in combination may be referred to as a computing server.

A user device 160 is a computing device that may transmit and receive data via the networks 190. Some or all of the components of a user device 160 are illustrated in FIG. 5. The user device 160 also may be referred to as a client device or an end user device. Various user devices 160 may belong to different parties or may be associated with individual end users. Administrative devices 116, transmitter devices 170, and recipient devices 180 may also be examples of user devices 160. A user device 160 includes one or more applications and user interfaces that may communicate visual, tactile, or audio elements of the applications. The user devices 160 may be any computing devices. Examples of such user devices 160 include personal computers (PC), desktop computers, laptop computers, tablets (e.g., iPADs), smartphones, wearable electronic devices such as smartwatches, or any other suitable electronic devices.

A user may be personnel, an expert, an outside contractor, a customer, or otherwise an end user associated with an organization 110 or someone who is unrelated to any organization 110. The user also may be referred to as a client or an end user. A user, through a user device 160, may communicate with other components in the system environment 100 in various suitable ways. For example, a user device 160 may include a user-side software application provided by an organization 110 or the third-party server 140. The user device 160 may interact with those components using a graphical user interface (GUI) of the software application. For example, an administrator (an example of a user) may specify the configurations of the authentication rules using a GUI of an application provided by the third-party server 140. An application may be a web application that runs on JavaScript or other alternatives. In the case of a web application, the application cooperates with a web browser to render a front-end interface. In another case, an application may be a mobile application. For example, the mobile application may run on Swift for iOS and other APPLE operating systems or on Java or another suitable language for ANDROID systems. In yet another case, an application may be a software program that operates on a desktop computer that runs on an operating system such as LINUX, MICROSOFT WINDOWS, MAC OS, or CHROME OS. In other cases, a user may communicate with the third-party server 140 by causing an administrator device 116 of an organization 110 to communicate directly to the third-party server 140, for example, via features such as Application Programming Interface (API) or like technologies such as webhooks. In other cases, a user device 160 may be a transmitter device 170 or a recipient device 180. For example, end users may send messages to each other and the messages may be authenticated through information provided by third-party server 140.

In the system environment 100, a transmitter device 170 and a recipient device 180 may be respectively the message transmitter and the message recipient. Messages are not limited to a particular type or format. Messages can be emails, text messages, instant messages, social media messages (e.g., FACEBOOK messages, posts, and TWEETS), RSS feeds, push notifications, Internet packets, data link frames, or any suitable data payloads. Messages may also include data or executable instructions such as software updates, firmware updates, and device configuration data or files. A message described in this disclosure does not always need to be a human-readable or machine-readable text string or communication. A message may also be information represented in a computer-readable form. A message may be a block of data, a payload, an executable set of instructions, human-written text, or any other suitable information that may be carried by one or more packets, data frames, or other suitable units of data, with or without control information, structured or unstructured, encrypted or not, and indexed or not. In some cases, if a message is sent from a message-delivering server, the message may bear the signature of the message-delivering server.

Various transmitter devices 170 may have identities that are defined under different domains or sub-domains. A transmitter device 170 may be an example of a named entity device that is under the control of an organization 110.

Messages sent from this transmitter device 170 may be authenticated based on the rules set by the organization 110. For transmitter devices 170 that are controlled by an organization 110 that has a domain, e.g., example.com, the identifiers of the transmitter devices 170 may be under the sub-domain such as devices.example.com, whose namespace may be delegated to the third-party server 140. Hence, when a recipient device 180 receives a message, the recipient device 180 may send an authentication query to the namespace server associated with the organization 110. The third-party server 140 may operate part of the namespace related to devices.example.com on behalf of the organization 110.

In some embodiments, a transmitter device 170 and a recipient device 180 may not transmit or receive messages directly through the networks 190. Instead, a message-delivering server 176 and a message-receiving server 186 transmit and receive messages on behalf of the devices. For example, in the setting of email communications, the message delivery server 176 sends emails on behalf of the transmitter device 170. The message delivery server 176 and message receiving server 186 may include one or more computing systems. As an example, the message delivery server 176 and the message receiving server 186 may be a mailing list server, a bulk mailer provider that sends emails on behalf of a domain, a transactional email system managed by a third party that sends emails on behalf of a domain, or a security system that scans emails on behalf of a domain. Generally, the message delivery server 176 and the message receiving server 186 may each be referred to as a mailbox service provider (MSP), which may also be known as an email service provider (ESP). The message delivery server 176, instead of the transmitter device 170, may send the email so that the message delivery server 176 may provide additional processing or functionality to the email. In one embodiment, the email sender 116 uses standard mail protocols, such as Simple Mail Transfer Protocol (SMTP). SMTP supports various features. U.S. Pat. No. 9,762,618, entitled "Centralized Validation of Email Senders via EHLO Name and IP address Targeting," patented on Sep. 12, 2017, is incorporated by reference for all purposes. Likewise, in the setting of email communications, a message-receiving server 186 may be an email server on the recipient end.

In some embodiments, for any incoming email, the message-receiving server 186 may perform one or more protocol checks such as email protocol checks, including SPF, DMARC, BIMI, TLS-RPT, and/or DANE. The results of those checks may be included as part of the header information of an email. In some embodiments, the secure server 130 may receive the results of those email protocol checks as part of the header of the email data received from a mailbox service provider. In some embodiments, the secure server 130, in receiving the email data from the mailbox service provider, may also independently perform any of those email protocol checks. In such a case, the email protocol checks by the secure server 130 may be performed in addition to the email protocol checks performed by the mailbox service provider.

In various embodiments in this disclosure, for simplicity and unless otherwise specified, the communication between a transmitter device 170 and a recipient device 180 may be described as a message transmitter or a message originator transmitting a message to a message recipient. This description should include the situation where a transmitter device 170 directly sends a message to a recipient device 180 and the situation where a message-delivering server 176 and a message-receiving server 186 are involved (e.g., in the context of email communication). The authentication may be performed at the recipient device 180 and/or at the message receiving server 186. For simplicity, a message recipient may refer to a recipient device 180 or a message receiving server 186, depending on the situation and the communication protocol used in transmitting the message. A message recipient may also be referred to as an authenticator. Likewise, a message transmitter may refer to a transmitter device 170 or a message-delivering server 176.

In this disclosure, any server, such as the secure server 130, the third-party server 140, the message delivery server 176, and the server 186 may include a combination of hardware and software. A server may include some or all example components of a computing machine described in FIG. 5. A server may take different forms. In one embodiment, a server may be a server computer that executes code instructions to perform various processes described herein. In another case, a server may be a pool of computing devices that may be located at the same geographical location (e.g., a server room) or be distributed geographically (e.g., cloud computing, distributed computing, or in a virtual server network). A server may include one or more servers, nodes, and/or clusters in a distributing computing environment. A server may also include one or more virtualization instances such as a container, a virtual machine, a virtual private server, a virtual kernel, or another suitable virtualization instance.

The networks 190 may include multiple communication networks that provide connections to the components of the system environment 100 through one or more sub-networks, which may include any combination of local area and/or wide area networks, using both wired and/or wireless communication systems. In one embodiment, a network 190 uses standard communications technologies and/or protocols. For example, a network 190 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 190 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 190 may be represented using any suitable format, such as hypertext markup language (HTML), extensible markup language (XML), JavaScript object notation (JSON), and structured query language (SQL). In some embodiments, all or some of the communication links of a network 190 may be encrypted using any suitable technique or techniques such as secure sockets layer (SSL), transport layer security (TLS), virtual private networks (VPNs), Internet Protocol security (IPsec), etc. The network 190 also includes links and packet-switching networks such as the Internet.

Example Administrator Identification Process

Figure 2A:
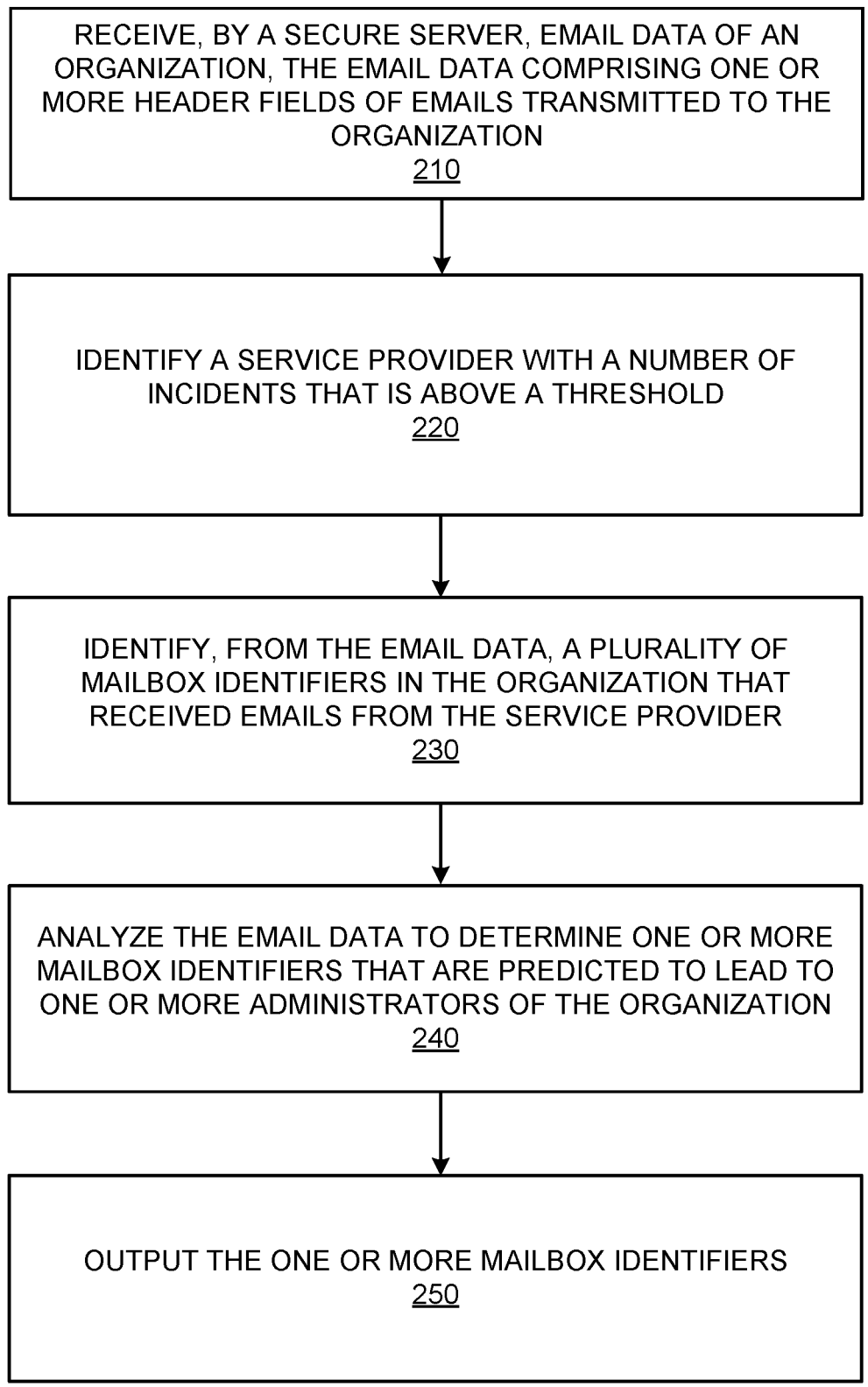
FIG. 2A is a flowchart depicting an example process for identifying an administrator in an organization, in accordance with some embodiments.

FIG. 2A is a flowchart depicting an example process 200 for identifying a contact who may be an administrator in an organization 110 or a contract who can likely lead to an administrator, in accordance with some embodiments. The process 200 may be performed by a computing device, such as the secure server 130. The process 200 may be embodied as a software algorithm that may be stored as computer instructions that are executable by one or more processors. The instructions, when executed by the processors, cause the processors to perform various steps in the process 200. One or more steps in the process 200 may be skipped, added, or changed in various embodiments. Although the process 200 is described as being performed by the secure server 130, the process 200 may also be performed by any computing server such as the third-party server 140. Also, while emails are used as a primary example of the type of messages that are analyzed by the process 200 and the process 260, various processes discussed in this disclosure may also be applied to other types of messages.

The secure server 130 may receive 210 email data of an organization 110. The organization 110 may be referred to as a domain owner, although the domain owner here may own several related domains. For example, a domain owner may own shoes.com, clothes.com, hats.com as different business lines or subsidiaries of the organization 110. The secure server 130 may receive email data through various suitable ways. In some embodiments, based on an authorization from an organization 110, the secure server 130 may establish a connection with a mailbox service provider of an organization 110 to receive message data such as email data of the organization 110 from the mailbox provider. In some embodiments, the secure server 130 may directly receive email data from the organization 110. For example, the secure server 130, in addition to providing services related to the process 200, may also serve as the mailbox service provider for the organization 110.

The extent of contents received by the secure server 130 may also vary in different embodiments. The email data may include one or more header fields of emails transmitted to the organization 110. Example header fields may include delivered-to email address, received, SMTP source, ARC-seal, ARC message signature, ARC authentication results, DMARC authentication results, DKIM result, DKIM signature, SPF result, return path, content identifier, to, subject, date, from, reply-to, from, message identifier, MIME version, etc. FIGS. 2B and 2C, combined, show an example header of a message, in accordance with some embodiments. The extent of information received by secure server 130 may depend on the agreement between the organization 110 and the secure server 130. For example, in some embodiments, the secure server 130 may receive only certain header fields of the message data. In other embodiments, the secure server 130 may receive the entire headers of the message data. In other embodiments, the secure server 130 may receive the body of the messages such as the content of the emails.

The secure server 130 may identify 220 as a service provider of the organization 110. The identified service provider is associated with a number of incidents that are above a threshold. For example, one or more DMARC, DKIM, and/or SPF checks may indicate that the service provider is one of the top failing senders. An incident may be an occurrence of an email failing one or more policies or authentication standards in an email protocol check. FIG. 3B is a conceptual diagram that illustrates an example graphical user interface that may be provided by third-party server 140 or secure server 130 to allow a message administrator 114 to select one of the failing senders to validate the service and see contact information that may lead to the likely administrator of the top failing service providers 120, in accordance with some embodiments. In some embodiments, the secure server 130 may also look for failing messages and see if the messages are targeting particular mailboxes. The secure server 130 may provide a report identifying targeted mailboxes without exposing the personal communications in the failing messages.

The secure server 130 may identify 230, from the message data, a plurality of mailbox identifiers that received emails from a service provider 120 of the organization 110. The mailbox identifiers (e.g., email addresses) may be the recipients of the organization 110, such as top employees to whom the failing messages are addressed. For example, the secure server 130 may intend to predict who the internal administrators of the organization 110 for the service provided by a service provider 120 are. The secure server 130 may examine the emails that are sent from the service provider 120 and identify a list of candidate mailbox identifiers that may lead to the administrators. The preliminary identification may include identifying mailbox identifiers that received emails from the secure server 130. If a large number of mailbox identifiers have received emails from the service provider 120, the secure server 130 may set a threshold or may identify top N mailbox identifiers as the candidates. Those identified mailbox identifiers may belong directly to the service administrators 112 of the service provider 120 or may belong to employees who may have information on the identities of the service administrators 112 of the service provider 120.

The secure server 130 may analyze 240 the message data to determine that one or more mailbox identifiers are predicted to lead to one or more administrators of the organization. For example, from the list of the candidate mailbox identifiers, the secure server 130 may analyze the message data to determine that one or more mailbox identifiers are the administrators' mailboxes or are related to the administrators. The secure server 130 may use various ways to identify the mailbox identifiers in various embodiments. In some embodiments, the secure server 130 may count the number of emails received by each mailbox identifier from the service provider 120 and determine that the top mailbox identifiers as the administrators. In some embodiments, the secure server 130 may use regular expressions to scan for keywords such as "invoice," "bill paid," "setting changed," etc. in one or more header fields such as the subject field to identify the administrators. For example, usually, only an administrator may receive an invoice from the service provider 120 or has the privilege to change settings. In some embodiments, the secure server 130 may process the content of the messages (such as the content of the emails) to identify the administrators. In some embodiments, the secure server 130 may convert one or more header fields as features of an input feature vector for a machine learning model and use the machine learning model to identify the administrators.

Various other ways to analyze 240 message data are also possible. For example, headers and system-specific metadata from the Google/M365 API may be analyzed. The secure server 130 may read the sending IP from the headers. The secure server 130 may read the mailbox ID from the API metadata to use in lieu of the recipient's email address, so that the secure server 130 is not storing information that if made public in a breach would be useful to anyone outside of their organization. In some embodiments, the secure server 130 may map the volume of emails from that IP to a particular mailbox. In some embodiments, the secure server 130 can also filter the messages based on other header fields and only count messages that pass one or more filters. In some embodiments, the secure server 130 may rely on regular expression. For example, '/invoice|billing|report/' could be applied to the sender address or subject line to filter only messages. Likewise, a regex such as '/webinar|spring sale|first month|trial/' could potentially be used to filter out messages that do not indicate relevance to a mailbox being used for communications involving a service administrator 112.

The secure server 130 may output 250 the one or more mailbox identifiers. The output may be a report that removes any personally identifiable information except the prediction that the mailbox identifiers may lead to the administrators. In some embodiments, each prediction may also be associated with a score that signifies the likelihood that the identified mailbox identifier is truly associated with an administrator. The output may be sent directly to the organization 110 or to the third-party server 140. For example, the third-party server 140 may provide a platform for a user from the organization 110 to determine the likely owners or relevant employees who know the likely owners of the service provided by a problematic service provider 120. FIG. 3C is a conceptual diagram of a graphical user interface that presents the result of the determination of the secure server 130 based on data that has personalized information largely removed, in accordance with some embodiments.

Figure 2D:
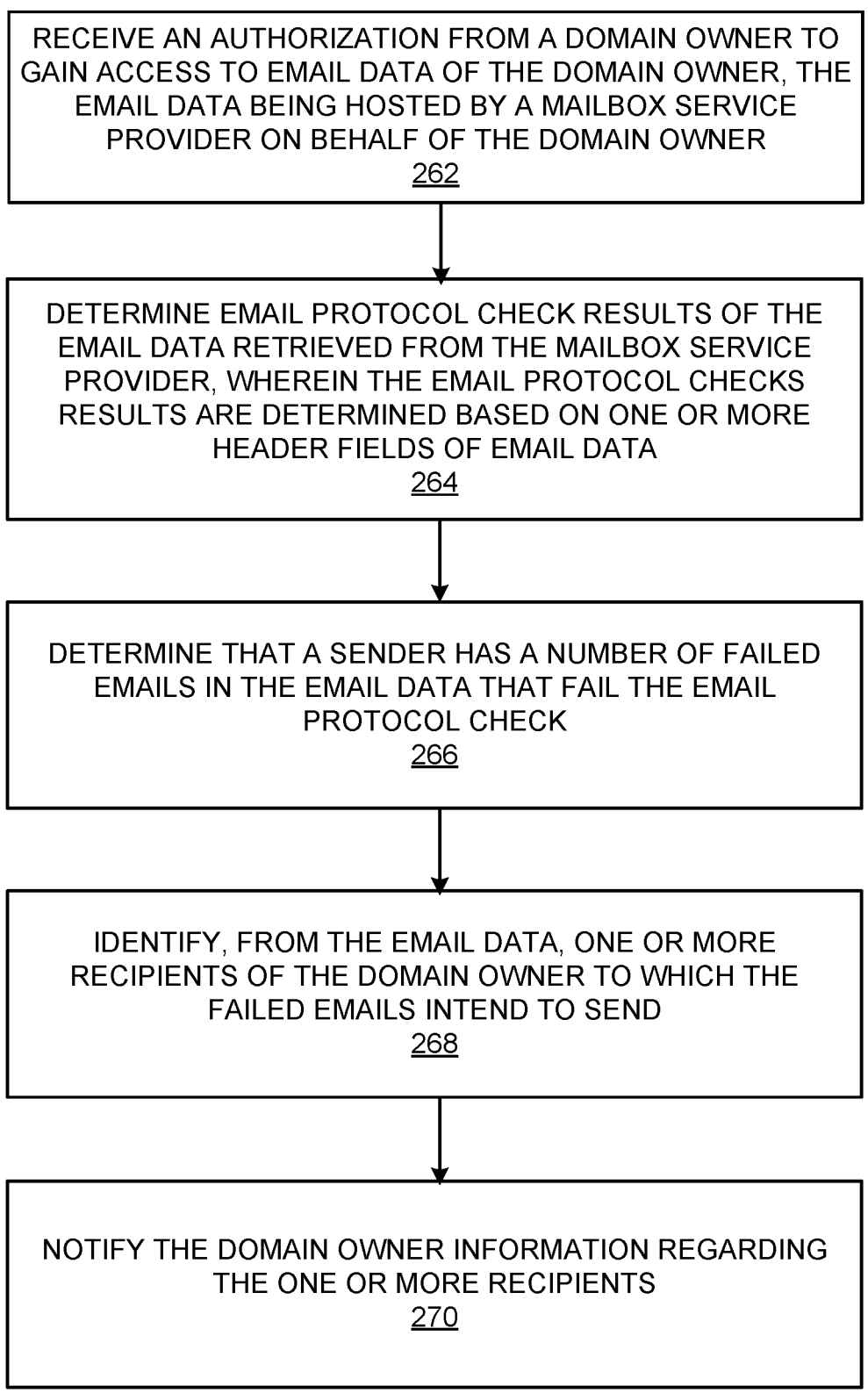
FIG. 2D is a flowchart depicting an example process for identifying a contact that may lead to an administrator in an organization who has connections with a sender organization, in accordance with some embodiments.

FIG. 2D is a flowchart depicting an example process 260 for identifying a contact that may lead to an administrator in an organization 110 who has connections with a sender organization, which may be a service provider 120, in accordance with some embodiments. The process 260 may be an example of the process 200. Any features discussed in the process 200 may also equally be applied to the process 260, with or without an explicit reference to the process 200. The process 260 may be performed by a computing device, such as the secure server 130, the third-party server 140, or combined. The process 260 may be embodied as a software algorithm that may be stored as computer instructions that are executable by one or more processors. The instructions, when executed by the processors, cause the processors to perform various steps in the process 260. One or more steps in the process 260 may be skipped, added, or changed in various embodiments.

The computing server may receive 262 an authorization from a domain owner to gain access to the email data of the domain owner. The domain owner may be an organization 110 that is a customer of the computing server, such as the third-party server 140. The email data may be hosted by a mailbox service provider on behalf of the domain owner. The computing server may provide various services to the domain owner, such as inbound email management and authentication, including statuses of various DMARC and other authentication issues of the senders that send emails to the domain, and outbound email management and authentication, such as the domain owner's own DMARC setting. FIG. 3D is an example graphical user interface that illustrates an onboarding process where a domain owner may provide authorization to the computing server to connect with a mailbox service provider. In some embodiments, upon connecting with the mailbox service provider, the domain owner may have a choice of the extent of sharing of the email data to the computing server. For example, in some embodiments, the mailbox service provider may share only the header fields of the email data with the computing server. In some embodiments, the mailbox service provider may not provide a level of granularity selection for email data sharing. The mailbox service provider may share the entire image of the email data to the computing server. In some embodiments, the computing server may be the secure server 130 to safeguard the security of the email data.

The computing server may determine 264 email protocol check results of the email data retrieved from the mailbox service provider, wherein the email protocol check results are determined based on one or more header fields of email data. In various embodiments, the email protocol checks may be different. In some embodiments, the email protocol checks include Domain-based Message Authentication, Reporting and Conformance (DMARC) checks. In some embodiments, the email protocol checks may include SPF, DMARC, BIMI, TLS-RPT, and/or DANE. In some embodiments, the email protocol checks may include authorization checks. In some embodiments, the email protocol checks may include authorization checks. In some embodiments, the email protocol checks may include an email recipient check that determines whether an email is sending to an email address that no longer exists.

In different embodiments, the ways to determine the results of the email protocol checks may vary. For example, in some embodiments, the mailbox service provider may have already conducted an email protocol check such as a DMARC check for each of the incoming emails. The mailbox service provider may put the results of various checks in the header fields of emails, such as those fields shown in the example header illustrated in FIG. 2B and FIG. 2C, including DMARC results, SPF results, DKIM results, and alignment results. In some embodiments, the computing server may perform email protocol checks if the mailbox service provider does not perform a particular email protocol check. Alternatively, the computing server may perform email protocol checks in addition to the mailbox service provider performing the same checks. An email protocol check may include receiving an email that is included in the email data. The email protocol check may also include examining one or more header fields in the email to identify a DNS address. The email protocol check may further include sending a query to the DNS server based on the DNS address to retrieve the DNS record. For example, for each of the email, the computing server may ping a DNS server based on the sender domain identifier in the "from" field of the email. Each sender may be associated with a different DNS server and address. The DNS server may provide a response that directs the computing server to a DMARC record. The computing server may conduct SPF and DKIM checks based on one or more further DNS records and determine whether the email passes or fails one or more email protocol checks.

The computing server may determine 266 that a sender has a number of failed emails in the email data that fail the email protocol check. The computing server may scan through each email in the email data retrieved from the mailbox service provider. Some of the emails may pass the email protocol check (or all of the email protocol checks) while other emails may fail one or more checks. For each sender, the computing server may count the number of failed emails that fail an email protocol check. A failed email may not necessarily mean the email failed to be delivered. In some situations, based on the policy rule in a DNS record, an email that fails a protocol check may still be delivered or may be delivered to a specific folder such as a folder designated as potential spam. The secure server 130 may rank the senders that have the most failed emails and display the top N of the senders. The selection of senders may also depend on a threshold number of failed emails. FIG. 3B is an example of such a display of the senders that have a certain number of failed emails.

The computing server may identify 268, from the email data, one or more recipients of the domain owner to whom the failed emails intend to be sent. In some embodiments, the sender is a service provider 120 of the domain owner or another entity such as a general marketer. The one or more recipients are predicted to lead to one or more administrators of the domain owner. An administrator may manage, for the domain owner, a service provided by the service provider.

In various embodiments, the computing server may use different ways to identify the recipients to whom the failed emails intend to be sent. In some embodiments, the computing server may examine the header fields of those failed emails, such as the "to" field to identify the intended recipient mailbox address. The recipients may be internal recipients of an organization 110 and may have mailbox addresses that bear the domain of the organization. The computing server may count the number of failed emails for each recipient and rank the recipients based on the number of failed emails that are intended to be sent to one or more recipients. The recipients who are more frequently receiving those failed emails may be the ones who are responsible for communicating with the sender or the ones who are closer to the actual administrator(s) who are responsible for communicating with the sender. In some embodiments, the computing server may identify one or more recipients of the domain owner without examining the bodies of the failed emails. For example, the computing server may only review the header information of the emails without examining the body of the messages. In some embodiments, other ways to identify the recipients are also possible, such as one or more ways discussed in step 240 on analyzing email data.

The computing server may notify 270 of the domain owner information regarding the one or more recipients. The modes of notifications may vary, depending on the situation. For example, the computing server may display the information on the SaaS platform that is provided to a service administrator 112. The SaaS platform may be part of the interface 142. The interface 142 may take the form of a graphical user interface that is configured to display that the one or more recipients are associated with the sender. The third-party server 140 may also transmit the information through an API communication. In some embodiments, the third-party server 140 may also report the information by messaging (e.g., emailing) the service administrators 112. The information may be the mailbox addresses of the one or more recipients, or any metadata extracted from the email headers that may be used to identify the one or more recipients.

In some embodiments, the interface that is used to notify 270 the domain owner may be part of a software-as-a-service (SaaS) platform provided by the computing server. The SaaS platform may allow the domain owner to provide authorization to the computing server to gain access to the email data. The SaaS platform may also display one or more senders that have emails that fail the email protocol check. The SaaS platform may also identify, for each displayed sender, one or more recipients that are associated with the sender.

The computing server and associated interface may perform additional steps that provide extra information to an organization 110. For example, the computing server may extract a header of a failed email that fails the email protocol check. The computing server may remove personally identifiable information from the header. The computing server may provide the domain owner with a copy of the header. For example, a copy may be accessible by the domain owner through a software platform provided by the computing server. FIGS. 3F and 3G are conceptual diagrams of example interfaces of the software platform that allow an administrator of the domain owner to review the header information. In some embodiments, the header information has removed personally identifiable information so that the privacy of the email owner.

In some embodiments, the computing server may identify a failed email that fails the email protocol check. The computing server may extract a message identifier of the failed email. In some embodiments, the message identifier is a globally unique identifier. In some embodiments, the message identifier is an identifier that is generated by the mailbox service provider of the sender. The computing server may provide the domain owner with a copy of the message identifier. A copy of the failed email may be retrievable at the mailbox service provider using the message identifier. FIGS. 3F and 3H are conceptual diagrams of example interfaces of a software platform that allow an administrator of the domain owner to obtain the message identifier. In some embodiments, the identifier is the Message-ID used in the mailbox service provider.

Example Data Exchange Process

Figure 3A:
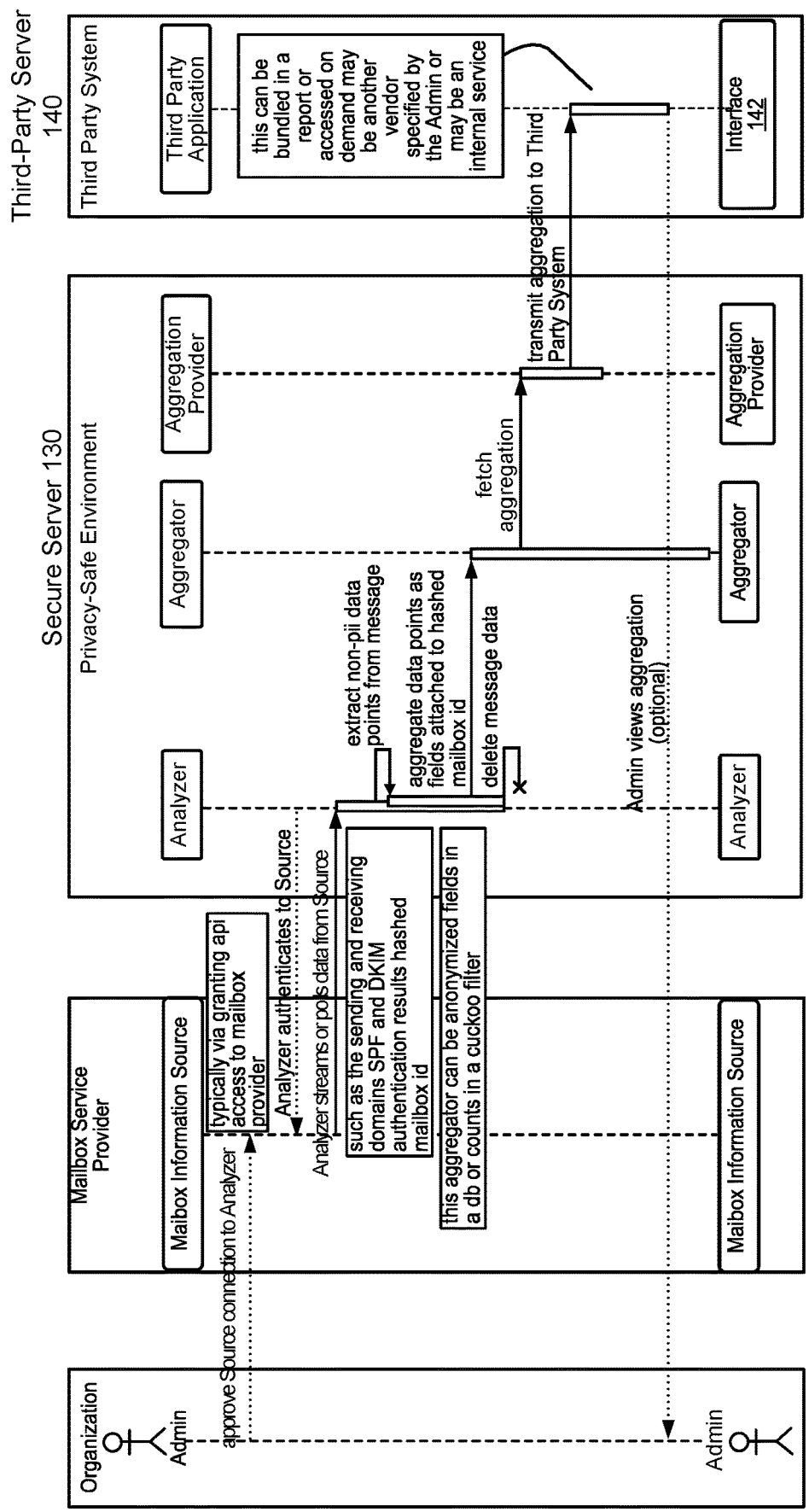
FIG. 3A is a flowchart depicting an example process for analyzing email data and aggregating email data, in accordance with some embodiments.
Figure 3B:
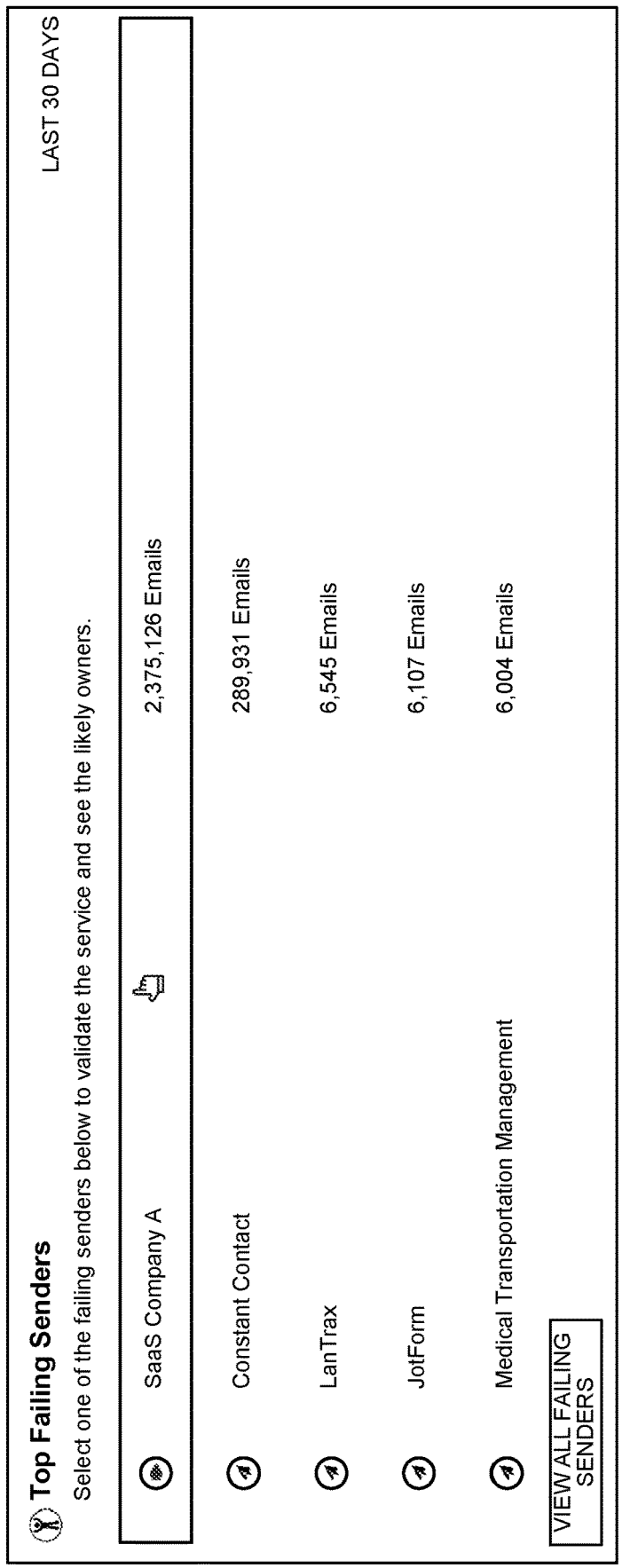
FIG. 3B is a conceptual diagram that illustrates an example graphical user interface, in accordance with some embodiments.

FIG. 3A is a flowchart depicting an example process 300 for analyzing message data and aggregating message data, in accordance with some embodiments. Email data is used as an example in the process 300, but other messages may also be used. The participating entities of the process 300 may include the organization 110, which may represent a domain owner that is discussed in the process 260, a mailbox provider 310, the secure server 130, and the third-party server 140. One or more steps in the process 300 may be skipped, added, or changed in various embodiments. The secure server 130 may be in a privacy-safe environment.

An admin at the organization 110 may approve a source connection between the mailbox provider and the analyzer of the secure server 130. The analyzer of the secure server 130 may establish connections with the mailbox information source, such as via the mailbox provider granting an API access. The analyzer of the secure server 130 may authenticate to the mailbox information source. After the API authentication, the analyzer of the secure server 130 may start retrieving data from the mailbox information source.

The analyzer of the secure server 130 may extract non-PII data points from the message data, such as the sending and receiving domains SPF and DKIM authentication results and the hashed mailbox identifiers. The analyzer of the secure server 130 may aggregate data points as fields attached to hashed mailbox identifiers. The aggregator can anonymize fields in a database or counts in a cuckoo filter. In some embodiments, after the aggregation, the analyzer may delete the message data. The admin of the organization 110 may view the aggregation.

The aggregation provider of the secure server 130 may receive aggregation from the aggregator. The aggregation provider may transmit the aggregation to the third-party server 140. The third-party server 140 may output a report. The aggregation may be bundled in a report or accessed on demand by another vendor specified by the organization 110 or by an internal service of the organization 110. The secure server 130 may send privacy-safe aggregated content to the third-party server 140 through normal channels and keep private data internal in the secure server 130.

Example Graphical User Interfaces

FIG. 3B through FIG. 3I are various conceptual diagrams illustrating example graphical user interface of a software platform provided by a computing server (e.g., secure server 130 or third-party server 140), in accordance with some embodiments.

FIG. 3B is a conceptual diagram of a graphical user interface that displays top failing senders that are identified by the process 200 or process 260, in accordance with some embodiments. The graphical user interface may be displayed to an administrator of a domain owner that grants authority to the computing server to access email data of the domain owner. The top failing senders are senders that send emails to the domain owner and have the most failing emails. The administrator may click on view all failing senders to expand the list to examine other failing senders that are ranked lower than the top ones.

FIG. 3C is a conceptual diagram of a graphical user interface that displays a list of failing senders, in accordance with some embodiments. The list of failing senders may be sorted by names (e.g., business names) of the senders, domains of the senders, or counts of the filing emails. An administrator may also specify the time range in generating the failing report. An administrator may click on view a full list of internal recipients to whom the failing emails are intended to address. FIG. 3D is a conceptual diagram of a graphical user interface that displays a list of recipients to whom the failing emails are intended to address, in accordance with some embodiments.

FIG. 3E is a conceptual diagram of a graphical user interface that displays an email insights report, in accordance with some embodiments. The computing server may receive the email data from the mailbox service provider of a domain owner. Instead of aggregating and summarizing top failing senders and/or top recipients, the computing server may analyze each of the failing emails (e.g., using the process 200 and the process 260) and list the failing emails individually. The failing emails may be filtered by recipient domain, from domain (sender domain), sending mailbox service provider, and date range. The failing emails may also be sorted by recipient domain, from domain, SPF results, DKIM results (or other email protocol check results that are not explicitly illustrated), sending service, source IP, received date header, message count, and other suitable metadata and email header fields discussed in this disclosure that are not explicitly illustrated. For each email, the administrator may also click on "view headers" to examine additional header information of a failing email.

FIG. 3F is a conceptual diagram of a graphical user interface that provides additional header information of a failing email, in accordance with some embodiments. The page may include basic message information, return path, claimed message sender, hidden header, authentication results, DKIM signature, and other suitable email header fields that are illustrated in FIG. 2B, FIG. 2C, or any place in this disclosure but are not explicitly illustrated here. An administrator may click on "view raw header" to view the raw header that may be similar to FIG. 2B and FIG. 2C. The administrator may also click on "view a failed email." FIG. 3G is a conceptual diagram of a graphical user interface that a raw header after an administrator clicks on "view raw header."

FIG. 3H is a conceptual diagram of a graphical user interface that displays the Message-ID of a failed email, in accordance with some embodiments. The page may be displayed after an administrator clicks on "view a failed email" on the page illustrated in FIG. 3F. By copying the Message-ID, the administrator may go to the mailbox service provider to retrieve the email message, provided the administrator has the privilege to access the message. In some cases, however, the email may have been removed and no longer available, whether due to the operation of the third-party server 140, by the mailbox service provider, or by the email recipient.

FIG. 3I is a conceptual diagram of a graphical user interface that displays an onboarding process for a domain owner to authorize the computing server to access email data, in accordance with some embodiments. The domain owner may go through the workflow process provided by the computing server to authorize the computing server to connect to the mailbox service provider of the domain owner.

Example Machine Learning Models

In various embodiments, a wide variety of machine learning techniques may be used for identifying mailbox identifiers that may lead to administrators. Examples include different forms of supervised learning, unsupervised learning, and semi-supervised learning such as decision trees, support vector machines (SVMs), regression, Bayesian networks, and genetic algorithms. Deep learning techniques such as embeddings, and neural networks, including convolutional neural networks (CNN), recurrent neural networks (RNN) and long short-term memory networks (LSTM), may also be used. Supervised techniques such as clustering may also be used.

In various embodiments, the training techniques for a machine learning model may be supervised, semi-supervised, or unsupervised. In supervised learning, the machine learning models may be trained with a set of training samples that are labeled, such as positive training samples that are emails associated with administrators and negative training samples that are emails not associated with administrators. For example, for a machine learning model trained to predict a mailbox identifier is associated with an administrator based on features of the emails, the positive training samples may be known administrators' emails that are converted to feature vectors. In some embodiments, the labels for each training sample may be binary or multi-class. In training a machine learning model for identifying administrators, the feature vectors may be various fields in the message headers. In some embodiments, the content that is converted to word embeddings may also be used. In some cases, an unsupervised learning technique may be used. The samples used in training are not labeled. Various unsupervised learning technique such as clustering may be used. For example, fraudulent account information may follow certain patterns and may be clustered together by an unsupervised learning technique. In some cases, the training may be semi-supervised with the training set having a mix of labeled samples and unlabeled samples. For example, some initial training samples may be labeled as initial seeds, but a large number of other emails may not be labeled.

A machine learning model may be associated with an objective function, which generates a metric value that describes the objective goal of the training process. For example, the training may intend to reduce the error rate of the model in predicting whether a mailbox identifier is associated with an administrator. In such a case, the objective function may monitor the error rate of the machine learning model. Such an objective function may be called a loss function. Other forms of objective functions may also be used, particularly for unsupervised learning models whose error rates are not easily determined due to the lack of labels. In account prediction, the objective function may correspond to the difference between the model's predicted outcomes and the manual labels in the training sets. In various embodiments, the error rate may be measured as cross-entropy loss, L1 loss (e.g., the sum of absolute differences between the predicted values and the actual value), L2 loss (e.g., the sum of squared distances).

Figure 4:
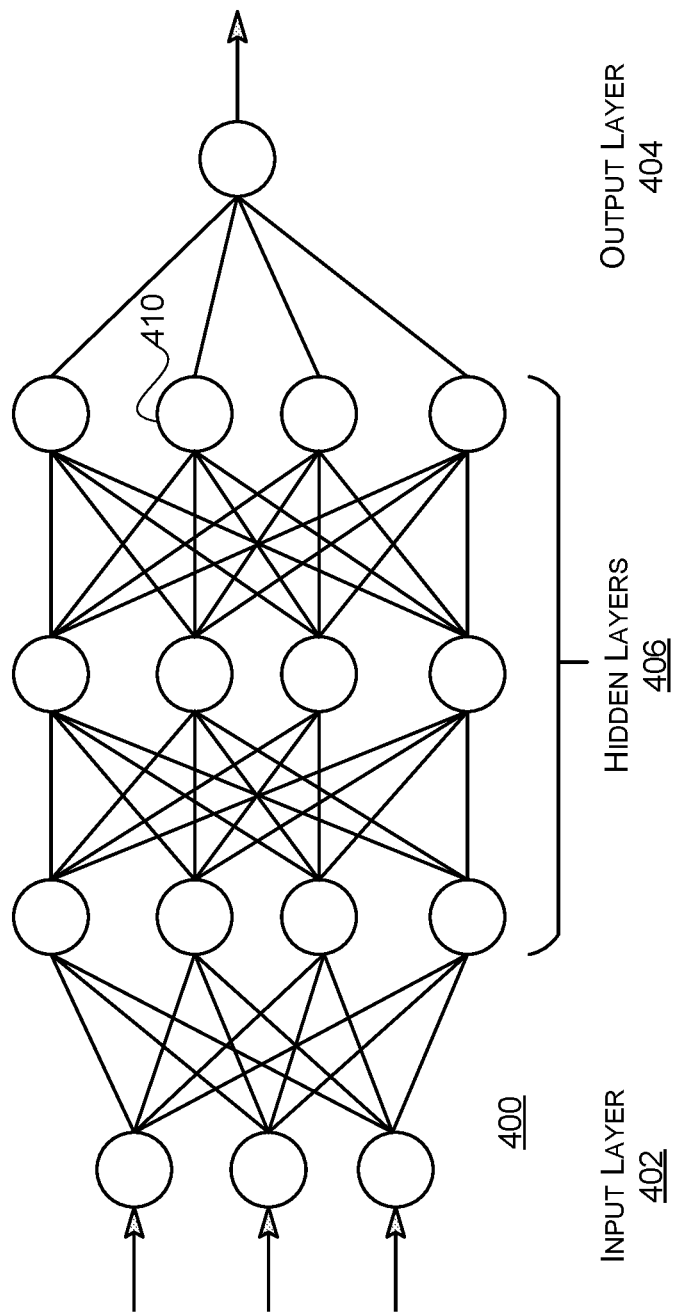
FIG. 4 is a conceptual diagram of a structure of an example neural network, in accordance with some embodiments.

Referring to FIG. 4, a structure of an example neural network is illustrated, in accordance with some embodiments. While an example structure of a neural network is shown, a machine learning model used in an embodiment is not limited to be a neural network. The neural network 400 may receive an input and generate an output. The neural network 400 may include different kinds of layers, such as convolutional layers, pooling layers, recurrent layers, fully connected layers, and custom layers. A convolutional layer convolves the input of the layer (e.g., an image) with one or more kernels to generate different types of images that are filtered by the kernels to generate feature maps. Each convolution result may be associated with an activation function. A convolutional layer may be followed by a pooling layer that selects the maximum value (max pooling) or average value (average pooling) from the portion of the input covered by the kernel size. The pooling layer reduces the spatial size of the extracted features. In some embodiments, a pair of convolutional layers and pooling layers may be followed by a recurrent layer that includes one or more feedback loops. The feedback may be used to account for spatial relationships of the features in an image or temporal relationships of the objects in the image. The layers may be followed by multiple fully connected layers that have nodes connected to each other. The fully connected layers may be used for classification and object detection. In one embodiment, one or more custom layers may also be presented for the generation of a specific format of output. For example, a custom layer may be used for image segmentation for labeling pixels of an image input with different segment labels.

The order of layers and the number of layers of the neural network 400 may vary in different embodiments. In various embodiments, a neural network 400 includes one or more layers 402, 404, and 406, but may or may not include any pooling layer or recurrent layer. If a pooling layer is present, not all convolutional layers are always followed by a pooling layer. A recurrent layer may also be positioned differently at other locations of the CNN. For each convolutional layer, the sizes of kernels (e.g., 3×3, 5×5, 7×7, etc.) and the numbers of kernels allowed to be learned may be different from other convolutional layers.

A machine learning model may include certain layers, nodes, kernels and/or coefficients. Training of a neural network may include iterations of forward propagation and backpropagation. Each layer in a neural network may include one or more nodes, which may be fully or partially connected to other nodes in adjacent layers. In forward propagation, the neural network performs the computation in the forward direction based on the outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Each of the functions in the neural network may be associated with different coefficients (e.g., weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other images in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be iteratively performed. Training may be completed when the objective function has become sufficiently stable (e.g., the machine learning model has converged) or after a predetermined number of rounds for a particular set of training samples. The trained machine learning model can be used for performing prediction or another suitable task for which the model is trained.

After the model is trained, multiple rounds of re-training may be performed. For example, the process may include periodically retraining the machine learning model. The periodic retraining may include obtaining an additional set of training data, such as through other sources, by usage of users, and by using the trained machine learning model to generate additional samples. The additional set of training data and later retraining may be based on updated data describing updated parameters in training samples. The process may also include applying the additional set of training data to the machine learning model and adjusting the parameters of the machine learning model based on the application of the additional set of training data to the machine learning model. The additional set of training data may include any features and/or characteristics that are mentioned above.

Computing Machine Architecture

FIG. 5 is a block diagram illustrating components of an example computing machine that is capable of reading instructions from a computer-readable medium and executing them in a processor (or controller). A computer described herein may include a single computing machine shown in FIG. 5, a virtual machine, a distributed computing system that includes multiple nodes of computing machines shown in FIG. 5, or any other suitable arrangement of computing devices.

By way of example, FIG. 5 shows a diagrammatic representation of a computing machine in the example form of a computer system 500 within which instructions 524 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 5 may correspond to any software, hardware, or combined components shown in various figures, such as various servers and devices shown in FIG. 1. While FIG. 5 shows various hardware and software elements, each of the components described in FIG. 1 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 524 that specify actions to be taken by that machine. Further, while only a single machine is illustrated, the terms "machine" and "computer"

may also be taken to include any collection of machines that individually or jointly execute instructions 524 to perform any one or more of the methodologies discussed herein.

The example computer system 500 includes one or more processors 502 such as a CPU (central processing unit), a GPU (graphics processing unit), a TPU (tensor processing unit), a DSP (digital signal processor), a system on a chip (SOC), a controller, a state machine, an application-specific integrated circuit (ASIC), a field-programmable gate array (FPGA), or any combination of these. Parts of the computing system 500 may also include a memory 504 that stores computer code including instructions 524 that may cause the processors 502 to perform certain actions when the instructions are executed, directly or indirectly by the processors 502. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 502 and reduce the space required for the memory 504. For example, the machine learning methods described herein reduce the complexity of the computation of the processors 502 by applying one or more novel techniques that simplify the steps in training, reaching convergence, and generating results of the processors 502. The algorithms described herein also reduce the size of the models and datasets to reduce the storage space requirement for memory 504.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though in the specification or the claims may refer some processes to be performed by a processor, this should be construed to include a joint operation of multiple distributed processors. In some embodiments, a computer-readable medium comprises one or more computer-readable media that, individually, together, or distributedly, comprise instructions that, when executed by one or more processors, cause the one or more processors to perform, individually, together, or distributedly, the steps of the instructions stored on the one or more computer-readable media. Similarly, a processor comprises one or more processors or processing units that, individually, together, or distributedly, perform the steps of instructions stored on a computer-readable medium. In various embodiments, the discussion of one or more processors that carry out a process with multiple steps does not require any one of the processors to carry out all of the steps. For example, a processor A can carry out step A, a processor B can carry out step B using, for example, the result from the processor A, and a processor C can carry out step C, etc. The processors may work cooperatively in this type of situations such as in multiple processors of a system in a chip, in Cloud computing, or in distributed computing.

The computer system 500 may include a main memory 504, and a static memory 506, which are configured to communicate with each other via a bus 508. The computer system 500 may further include a graphics display unit 510 (e.g., a plasma display panel (PDP), a liquid crystal display (LCD), a projector, or a cathode ray tube (CRT)). The graphics display unit 510, controlled by the processors 502, displays a graphical user interface (GUI) to display one or more results and data generated by the processes described herein. The computer system 500 may also include an alphanumeric input device 512 (e.g., a keyboard), a cursor control device 514 (e.g., a mouse, a trackball, a joystick, a motion sensor, or another pointing instrument), a storage unit 516 (a hard drive, a solid state drive, a hybrid drive, a memory disk, etc.), a signal generation device 518 (e.g., a speaker), and a network interface device 520, which also are configured to communicate via the bus 508.

The storage unit 516 includes a computer-readable medium 522 on which is stored instructions 524 embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting computer-readable media. The instructions 524 may be transmitted or received over a network 526 via the network interface device 520.

While computer-readable medium 522 is shown in an example embodiment to be a single medium, the term "computer-readable medium" should be taken to include a single medium or multiple media (e.g., a centralized or distributed database, or associated caches and servers) able to store instructions (e.g., instructions 524). The computer-readable medium may include any medium that is capable of storing instructions (e.g., instructions 524) for execution by the processors (e.g., processors 502) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issued on an application based hereon. Accordingly, the disclosure of the embodiments is intended to be illustrative, but not limiting, of the scope of the patent rights.

The invention claimed is:

1. A system comprising:
a computing server comprising memory and one or more processors, the memory configured to instructions, wherein the instructions, when executed by the one or more processors, cause the one or more processors to:
receive an authorization from a domain owner to gain access to email data of the domain owner, the email data being hosted by a mailbox service provider on behalf of the domain owner;
determine email protocol check results of the email data retrieved from the mailbox service provider, wherein the email protocol checks results are determined based on one or more header fields of email data;
determine that a sender has a number of failed emails in the email data that fail the email protocol check; and
identify, from the email data, one or more recipients of the domain owner to whom the failed emails intend to be sent; and
an interface in communication with the computing server, the interface configured to notify the domain owner regarding information about the one or more recipients.

2. The system of claim 1, wherein the interface is a graphical user interface, and the graphical user interface is configured to display mailbox addresses of the one or more recipients.

3. The system of claim 2, wherein the graphical user interface is part of a software-as-a-service (SaaS) platform provided by the computing server, the SaaS platform configured to:
allow the domain owner to provide authorization to the computing server to gain access to the email data;
display one or more senders that have emails that fail the email protocol check; and
identify, for each displayed sender, one or more recipients to whom the failed emails intend to be sent.

4. The system of claim 1, wherein the instructions of the computing server, when executed, further cause the one or more processors to:
extract a header of a failed email that fails the email protocol check;
remove personal identifiable information from the header; and
provide the domain owner a copy of the header.

5. The system of claim 1, wherein the instructions of the computing server, when executed, further cause the one or more processors to:
identify a failed email that fails the email protocol check;
extract a message identifier of the failed email, the message identifier generated by the sender; and
provide the domain owner a copy of the message identifier, wherein a copy of the failed email is retrievable at the mailbox service provider using the message identifier.

6. The system of claim 1, wherein the email protocol checks include Domain-based Message Authentication, Reporting and Conformance (DMARC) checks.

7. The system of claim 1, wherein the sender is a service provider of the domain owner, and the one or more recipients are predicted to lead to one or more administrators of the domain owner, wherein an administrator manages, for the domain owner, a service provided by the service provider.

8. The system of claim 1, wherein the computing server identify the one or more recipients of the domain owner without examining bodies of the failed emails.

9. The system of claim 1, wherein the email protocol checks comprise:
receiving an email that is included in the email data;
examining one or more header fields in the email to identify a DNS address; and sending a query to a DNS server based on the DNS address to retrieve a DNS record.

10. The system of claim 1, wherein the instruction to identify, from the email data, the one or more recipients of the domain owner to whom the failed emails intend to be sent comprises instructions to rank the one or more recipients based on numbers of the failed emails that are intended to send to the one or more recipients.

11. A computer-implemented process, comprising:
receiving an authorization from a domain owner to gain access to email data of the domain owner, the email data being hosted by a mailbox service provider on behalf of the domain owner;
determining email protocol check results of the email data retrieved from the mailbox service provider, wherein the email protocol checks results are determined based on one or more header fields of email data;
determining that a sender has a number of failed emails in the email data that fail the email protocol check; and
identifying, from the email data, one or more recipients of the domain owner to whom the failed emails intend to be sent; and
notifying the domain owner regarding information about the one or more recipients.

12. The computer-implemented process of claim 11, wherein notifying the domain owner regarding information about the one or more recipients is through a graphical user interface, and the graphical user interface is configured to display mailbox addresses of the one or more recipients.

13. The computer-implemented process of claim 12, wherein the graphical user interface is part of a software-as-a-service (SaaS) platform provided by a computing server, the SaaS platform configured to:
allow the domain owner to provide authorization to the computing server to gain access to the email data;
display one or more senders that have emails that fail the email protocol check; and
identify, for each displayed sender, one or more recipients to whom the failed emails intend to be sent.

14. The computer-implemented process of claim 11, further comprising:
extracting a header of a failed email that fails the email protocol check;
removing personal identifiable information from the header; and
providing the domain owner a copy of the header.

15. The computer-implemented process of claim 11, further comprising:
identifying a failed email that fails the email protocol check;
extracting a message identifier of the failed email, the message identifier generated by the sender; and
providing the domain owner a copy of the message identifier, wherein a copy of the failed email is retrievable at the mailbox service provider using the message identifier.

16. The computer-implemented process of claim 11, wherein the email protocol checks include Domain-based Message Authentication, Reporting and Conformance (DMARC) checks.

17. The computer-implemented process of claim 11, wherein the sender is a service provider of the domain owner, and the one or more recipients are predicted to lead to one or more administrators of the domain owner, wherein an administrator manages, for the domain owner, a service provided by the service provider.

18. The computer-implemented process of claim 11, further comprising identifying the one or more recipients of the domain owner without examining bodies of the failed emails.

19. The computer-implemented process of claim 11, wherein the email protocol checks comprise:
receiving an email that is included in the email data;
examining one or more header fields in the email to identify a DNS address; and
sending a query to a DNS server based on the DNS address to retrieve a DNS record.

20. One or more non-transitory computer readable media configured to store code comprising instructions, wherein the instructions, when executed by one or more processors, cause the one or more processors to:
receive an authorization from a domain owner to gain access to email data of the domain owner, the email data being hosted by a mailbox service provider on behalf of the domain owner;
determine email protocol check results of the email data retrieved from the mailbox service provider, wherein the email protocol checks results are determined based on one or more header fields of email data;
determine that a sender has a number of failed emails in the email data that fail the email protocol check; and
identify, from the email data, one or more recipients of the domain owner to whom the failed emails intend to be sent; and
notify the domain owner regarding information about the one or more recipients.

* * * * *